(12) United States Patent
Itoh et al.

(10) Patent No.: US 7,468,959 B2
(45) Date of Patent: Dec. 23, 2008

(54) COMMUNICATION SYSTEM AND COMMUNICATION TERMINAL APPARATUS

(75) Inventors: Katsutoshi Itoh, Tokyo (JP);
Mitsuyoshi Yasuda, Tokyo (JP);
Makoto Natori, Saitama (JP); Osamu Yoshimura, Kanagawa (JP); Minoru Yokoshi, Tokyo (JP); Takeshi Itagaki, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 544 days.

(21) Appl. No.: 11/170,565

(22) Filed: Jun. 29, 2005

(65) Prior Publication Data
US 2006/0002337 A1    Jan. 5, 2006

(30) Foreign Application Priority Data
Jun. 30, 2004    (JP)    ............................. P2004-195063

(51) Int. Cl.
*H04Q 7/00* (2006.01)
(52) U.S. Cl. ..................... 370/328; 370/342; 455/418; 455/421; 455/404.2; 455/456.1
(58) Field of Classification Search .................. 370/328, 370/342; 455/418, 421, 404.2, 456.1
See application file for complete search history.

(56) References Cited

U.S. PATENT DOCUMENTS 5,991,637 A * 11/1999 Mack et al. .................. 455/563
6,151,493 A    11/2000 Sasakura et al.
2006/0019678 A1 * 1/2006 Itoh et al. ................. 455/456.4

FOREIGN PATENT DOCUMENTS

| FR | 2 813 422 | 3/2002 |
|----|-----------|--------|
| JP | 11-88499 | 3/1999 |
| JP | 2001 352579 | 12/2001 |
| JP | 2001 358827 | 12/2001 |
| JP | 2003-87368 | 3/2003 |
| WO | WO 98 34417 | 8/1998 |
| WO | WO 03 009620 | 1/2003 |
| WO | WO 03 049051 | 6/2003 |

* cited by examiner

*Primary Examiner*—Nghi H Ly
(74) *Attorney, Agent, or Firm*—Frommer Lawrence & Haug LLP; William S. Frommer; Thomas F. Presson

(57) ABSTRACT

A communication terminal apparatus and a wireless key apparatus including judgment means for judging or presuming the wireless communication state or the wireless communication distance in a communication circuit. The communication terminal apparatus and the wireless key apparatus are wireless-connected, and in a case when a communication state for carrying out a wireless communication intermittently is set in each communication circuit and there is judgment or presumption of a predetermined state in the judgment means in a state in which the wireless connection is maintained, the mode setting relating to the function limitation or the notification mode setting relating to the function limitation is to be changed.

8 Claims, 24 Drawing Sheets

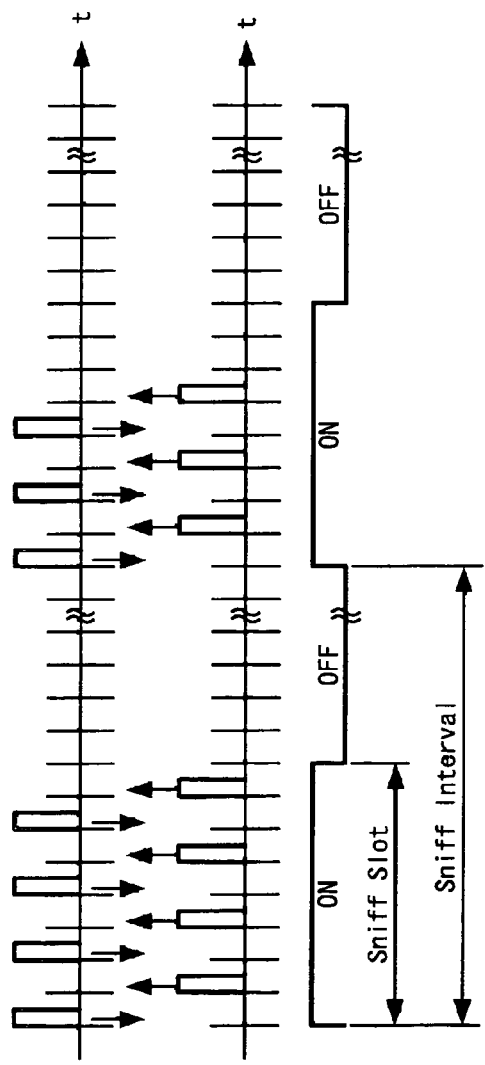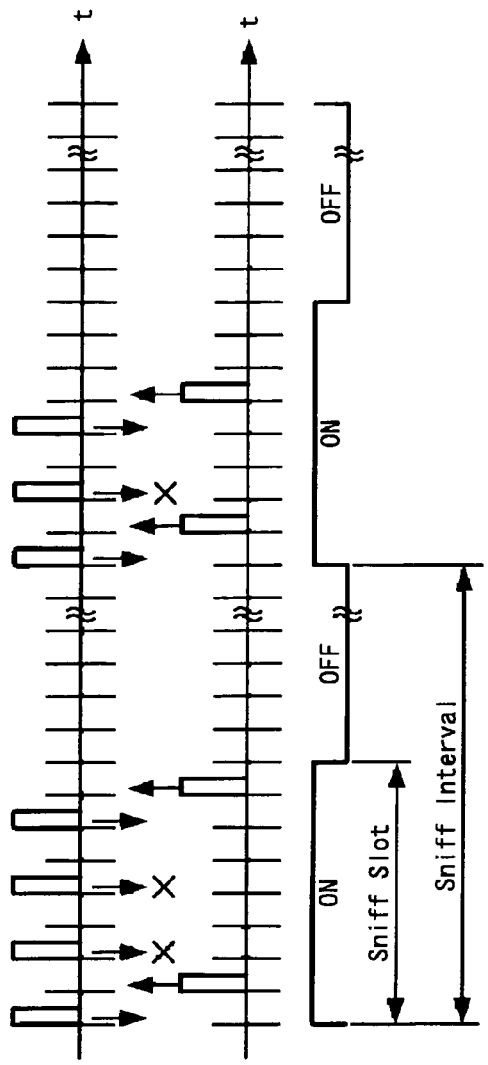
FIG. 31A Wirelrss Key Apparatus
FIG. 31B Mobile Terminal
FIG. 32A Wirelrss Key Apparatus
FIG. 32B Mobile Terminal

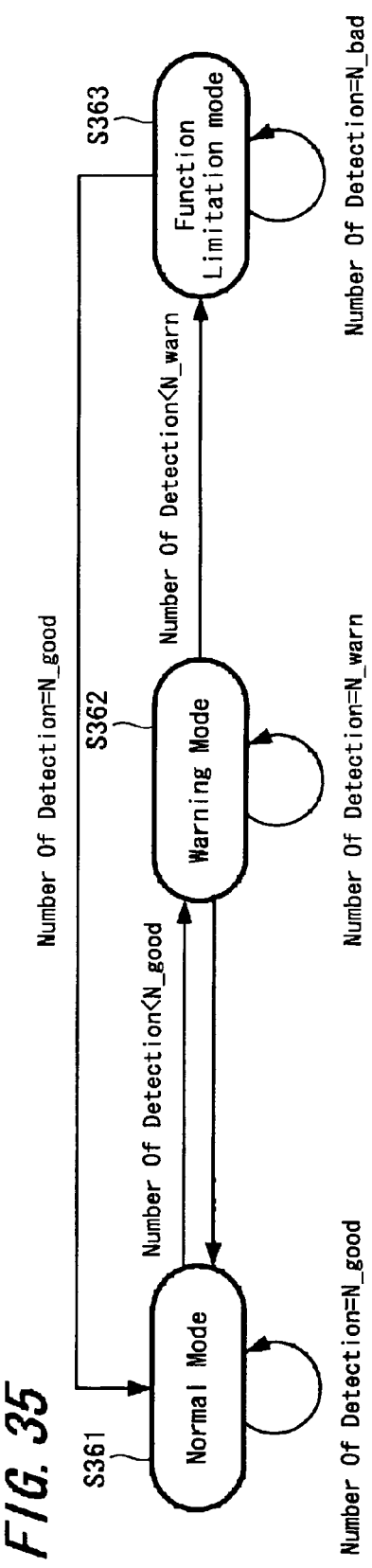
FIG. 35
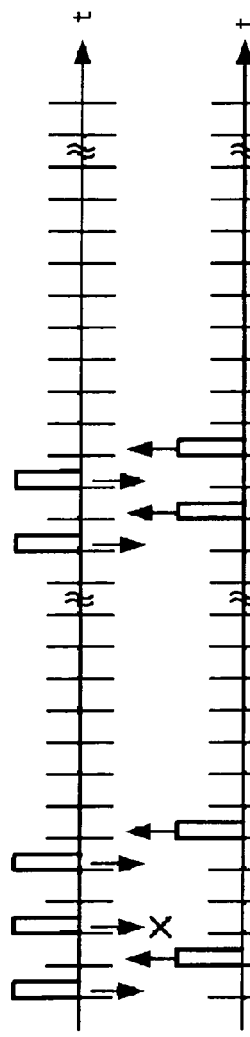
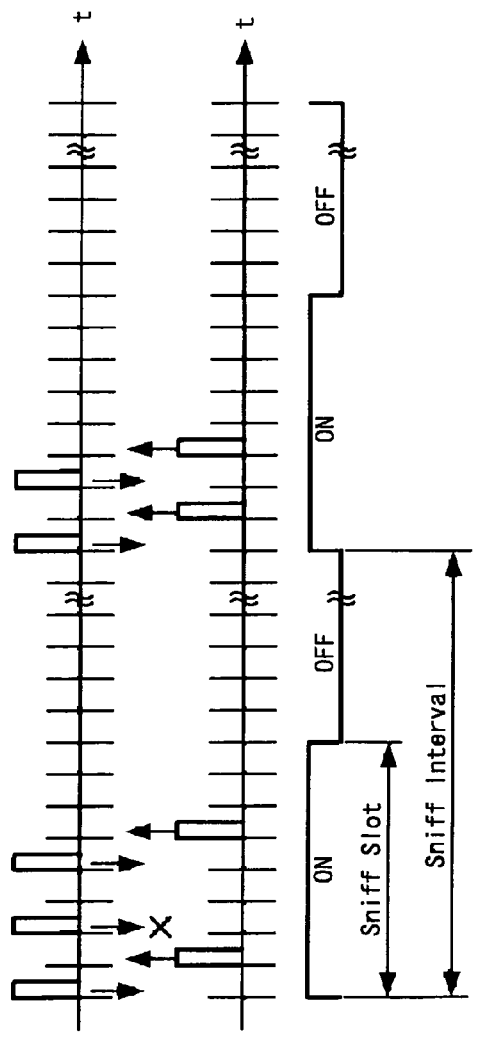
FIG. 36A  Wirelrss Key Apparatus
FIG. 36B  Mobile Terminal

COMMUNICATION SYSTEM AND COMMUNICATION TERMINAL APPARATUS

CROSS REFERENCES TO RELATED APPLICATIONS

The present invention contains recognized/(object) matter related to Japanese Patent Application JP 2004-195063 filed in the Japanese Patent Office on Jun. 30, 2004, the entire contents of which being incorporated herein by reference.

BACKGROUND OF THE INVENTION

1. Field of the Invention

The present invention relates, for example, to a communication system suitable for being applied to an apparatus constituted by a communication terminal apparatus such as a mobile telephone terminal and a wireless key apparatus restricting the operation of the terminal apparatus and to a communication terminal apparatus constituting the communication system.

2. Description of the Related Art

In recent years, a mobile telephone terminal which is one of communication terminal apparatuses a user always taking along in possession has a trend such that various functions other than wireless telephone functions of primary functions are built-in so as to contain multi functions.

For example, there exists such a terminal in which a camera function carrying out a filming of a still picture and a moving picture, a recording and reproducing function of music data, a viewing and listening function of television broadcast or the like is built-in.

In addition, there has been developed a mobile telephone terminal in which a function as a non-contacting IC card which has been prevailing rapidly in recent years is built-in. This non-contacting IC card is utilized as a boarding ticket of transport facilities, a membership card, an employee ID card, a card for price settlement means at a shop or the like where an authentication process is carried out by performing wireless communication between adjacent reader and writer, so that it is easy-to-use as compared with a magnetic card or the like. It should be noted in a case when an IC card function unit is mounted in a mobile terminal that the IC card function unit is not always necessarily to have a card type shape.

And now, it is preferable for the mobile telephone terminal having multi functions in this manner to be carried out with a process in order to secure some kind or another security for preventing various functions provided in the terminal from being abused when the terminal is lost. In particular, in case of a terminal installed with an IC card function unit, there is a possibility that personal information stored as the IC card function is read out unjustly or unjust settlement or the like utilizing the IC card function is carried out, so that the necessity for a function for preventing the unjust use thereof is high. There are descriptions, for example, in patent documents 1 and 2 that a wireless card which forms a pair with respect to the mobile telephone terminal is prepared and authentication request is wireless-transmitted periodically from that wireless card such that the functions of mobile telephone terminal is made to be restricted in a case when collation with respect to the authentication request cannot be taken.

[Patent Document 1] Jap. laid-open patent publication No. 2001-352579

[patent document 2] Jap. laid-open patent publication No. 2001-358827

However, if it is attempted to provide in a mobile telephone terminal with a communication circuit for carrying out an exclusive authentication process or authentication processing means for carrying out function limitation of that terminal such as shown in the descriptions in the patent documents 1 and 2, there is a problem that the constitution of the terminal becomes complicated. In case of carrying out such a wireless communication for the function limitation, if various wireless communication systems existing in the related art can be applied as they are, it is to contribute to lowering the cost of a mobile terminal.

However, in a case when it is considered to use various wireless communication systems existing in the related art as they are for the purpose of security assuring, a case is supposed in which the function limitation does not always function effectively. More specifically, it is fundamental for a commonly used wireless communication system existing in the related art to carry out a wireless communication with a terminal of a partner as favorably as possible within the specification given by the wireless system. Consequently, for example, a wireless card for carrying out function limitation of a mobile telephone terminal and its terminal is prepared and even if a system is composed assuming that the function of the mobile telephone terminal is made to be limited in a case when the distance between the both sides becomes apart equal or more than around several meters, it is practically difficult to define one-sidedly a distance which makes the wireless communication possible between the mobile telephone terminal and the wireless card such that it is supposed that there were various problems for making it practicable wherein in case of a favorable communication environment, the function limitation is made effective after a quite far distance and in case of an inferior communication environment on the contrary, the wireless communication cannot be carried out even if the mobile telephone terminal and the wireless card are adjacent and the function limitation is made effective.

Also, it is preferable for a wireless apparatus such as a wireless card or the like which is used as a pair with a mobile telephone terminal not to take a lot of trouble as much as possible for everyday use, but practically, relatively a large power consumption occurs when it always exchanges data for authentication or the like with a mobile telephone terminal, so that it is frequently necessary to exchange or charge a battery and there was a problem that it took a lot of trouble for functioning it as an authentication apparatus.

SUMMARY OF THE INVENTION

The present invention was invented in view of aforesaid matters and has recognized that in case of carrying out a process performing security control of a communication terminal apparatus such as a mobile telephone terminal in response to a wireless communication situation with other communication apparatus, a mode setting of the security control or the like can be performed favorably with a low power consumption.

According to the present invention, in case of setting a notification mode with reference to a mode relating to limiting a function of a communication terminal apparatus or its function limitation in response to the communication state of the communication terminal apparatus and the wireless key apparatus, the communication terminal apparatus and the wireless key apparatus are provided with judgment means for judging or presuming wireless communication state or wireless communication distance in the communication circuit, the communication terminal apparatus and the wireless key apparatus are wireless-connected and a communication state for carrying out a wireless communication in each communication circuit intermittently is to be set, and in a case when there is a judgment or presumption of a predetermined state in the judgment means under a condition that the wireless connection is maintained, the notification mode setting with reference to the mode setting relating to the function limitation or the function limitation is made to change.

By constituting in this manner, a wireless connection is carried out between the communication terminal apparatus and the wireless key apparatus and also, in a case when the wireless communication state or the wireless communication distance changed in a state where transmission and reception are carried out intermittently, that matter is judged or presumed and a mode setting relating to function limitation or a notification mode setting relating to function limitation can be change, so that it is possible to change a mode relating to function limitation or the like even if there is no change in a wireless communication process state which was determined in the wireless communication system.

According to the present invention, it is possible to change a mode relating to the function limitation or the like by a change of the state of the wireless communication or the distance of the wireless communication even if there is no change in the state of the wireless communication process which is determined according to the wireless communication system. Consequently, it becomes possible to set a mode relating to the function limitation or the like properly by the setting of the state of the wireless communication process and the change of the wireless communication state or the wireless communication distance during the communication in the set state of the wireless communication process even if data such as a mode relating to the function limitation or the like are not directly exchanged between the communication terminal apparatus and the wireless key apparatus. Consequently, in a case, for example, when the interval of the communication terminal apparatus and the wireless key apparatus is apart by several meters or more, it becomes possible according to the wireless communication state or the like simply and also reliably to execute a function limitation by changing a mode relating to the function limitation or to carrying out a notification that its function limitation is to carry out. The process can be performed by low power consumption without directly exchanging data of a mode relating to the function limitation or the like.

In a case when, it is constituted such that the result judged or presumed in judgment means is notified to the communication partner by a wireless communication through a communication circuit and at the same time, setting of a mode relating to the function limitation or a notification mode relating to the function limitation is to be changed according to a combination of the received result and the judged state or the presumed state in the judgment means after the judged or presumed result transmitted from the communication partner is received, so that it becomes possible to detect distance change between the communication terminal apparatus and the wireless key apparatus or the like more accurately and more favorable mode setting comes to be carried out.

Also, the process for judging or presuming in the judgment circuit is a measurement of the strength of the received electric field relating to the signal received by the communication circuit, so that it becomes possible to judge (presume) the wireless communication state or the wireless communication distance simply.

Also, it is constituted such that the wireless communication state or the wireless communication distance is judged or presumed according to the variation difference of the judged value of the strength of the received electric field, so that it can be judged from the relative wireless communication state and it becomes possible to judge favorably.

Also, in the process for judging or presuming in the judgment means, the judgment or presumption is carried out according to a detection state of the signal packet received by the communication circuit, so that it becomes possible to judge (presume) the wireless communication state or the wireless communication distance simply from error rate of the received packet or the like.

Also, in a case when the detection state of the signal packet is used for the process, the number of packets transmitted is changed according to the received result which was judged or presumed, so that it becomes possible for the partner side to judge (presume) the wireless communication state simply by the number of packets.

Further, it is constituted such that the judgment result is notified to the control unit and the control unit carries out the mode setting process only in a case when the judgment state in the judgment means changes by equal to or more than a predetermined degree, so that it is possible to make the control unit intervene only in a case when a control process relating to a mode change is carried out. In a case when the distance between the both sides or the like does not change, even if, for example, a wireless communication is carried out steadily between the communication terminal apparatus and the wireless key apparatus, it is not necessary for the control unit to carry out a control process relating to the function limitation mode, the load of the control unit can be lightened and it leads to a constitution formed by a low power consumption.

BRIEF DESCRIPTION OF THE DRAWINGS

FIGS. 31A and 31B are timing diagrams showing a packet transmission process example according to a second exemplified embodiment of the present invention;

FIGS. 32A and 32B are timing diagrams showing a packet transmission process example (example in a case when error exists) according to a second exemplified embodiment of the present invention;

FIG. 35 is a flowchart showing a mode transition example according to a second exemplified embodiment of the present invention;

FIGS. 36A and 36B are timing diagrams showing a transmission process example when the transmission number of packets is limited according to a second exemplified embodiment of the present invention.

DESCRIPTION OF THE PREFERRED EMBODIMENTS

Hereinafter, an example of one embodiment of the present invention will be explained with reference to FIGS. 1 to 30.

In the present invention, a wireless key apparatus carrying out a wireless communication with a mobile telephone terminal apparatus is prepared and it is constituted such that security lock of the mobile telephone terminal apparatus is to be carried out according to a wireless communication state of the both sides.

Figure 1:
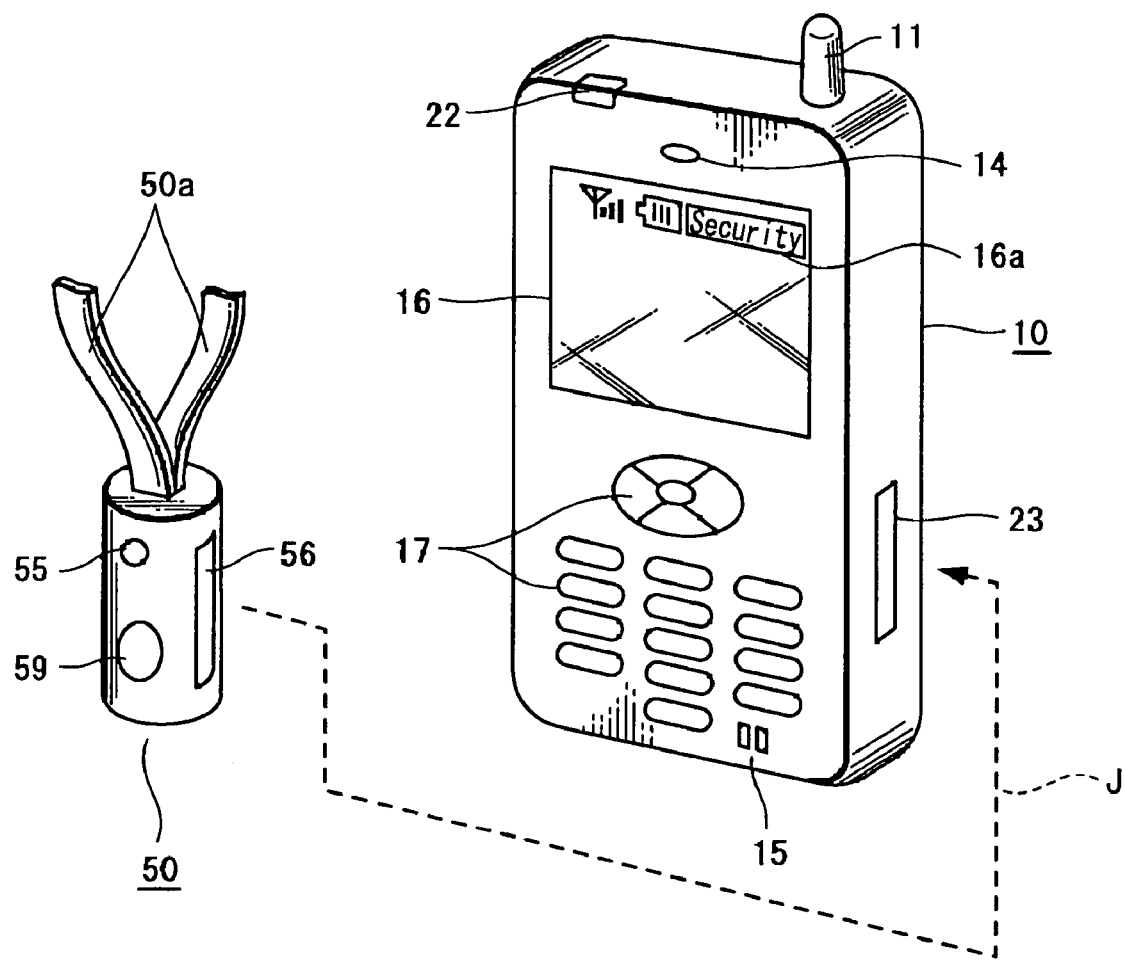
FIG. 1 is a perspective view showing a system constitutional example according to a first exemplified embodiment of the present invention.

FIG. 1 is a diagram showing an example of an apparatus of the present invention. A wireless key apparatus 50 is prepared as a separate body with a mobile telephone terminal apparatus 10. According to this example, the wireless key apparatus 50 is constituted in a smaller size as compared with the mobile telephone terminal apparatus 10 and, for example, it is constituted such that it is hung around the neck of a user by a neck strap 50a or the like and is made to be a small sized shape which a user can always wear. The wireless key apparatus 50 is arranged with a light emitting unit 55 and an operation unit 59 (constituted in FIG. 1 such that they are push button shaped), and it is also constituted such that a terminal unit 56 for connecting with the mobile telephone terminal apparatus 10 is prepared.

As a mobile telephone terminal apparatus 10, there is shown here an example of a general mobile telephone terminal. In the mobile telephone terminal apparatus 10, there are arranged an antenna 11 for a wireless telephone communication, a speaker 14, a microphone 15, a display unit 16, an operation unit (operation key) 17, a light emitting unit 22 and the like. Also, a terminal unit 23 for connecting with the wireless key apparatus 50 is prepared. This terminal unit 23 may be used as an existing terminal which is prepared for the mobile telephone terminal apparatus 10 to be connected with a charger or various external apparatuses. Also, it may be constituted in the display unit 16 such, for example, that a security display 16a showing that it is in an operation under a state that security is assured as explained hereinafter and a display (not shown) showing a fact that a so-called security lock in which the operation is limited according to its security function is executed may be carried out.

Figure 2:
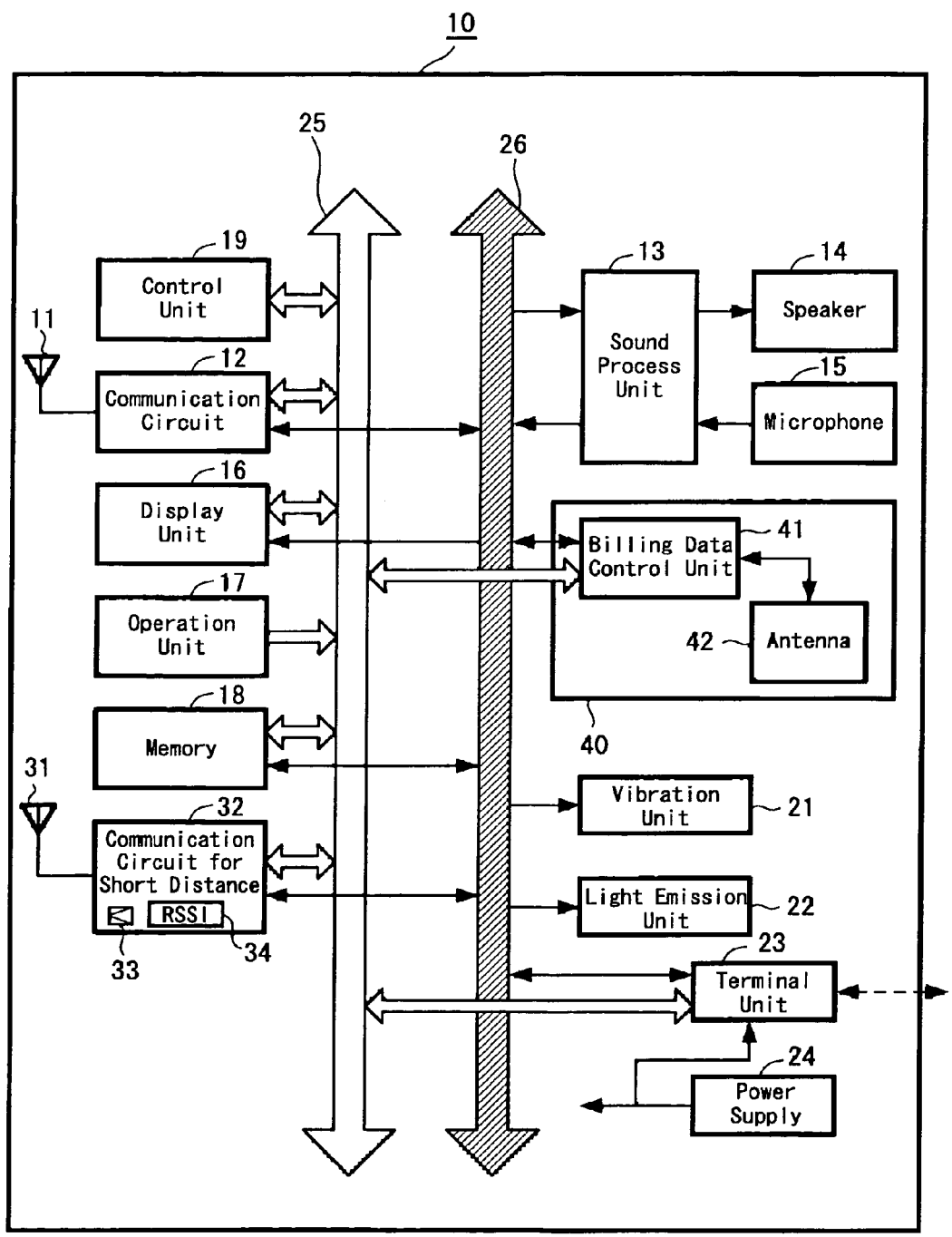
FIG. 2 is a block diagram showing a constitutional example of a communication terminal apparatus according to a first exemplified embodiment of the present invention.

Next, a constitutional example of the mobile telephone terminal apparatus 10 of the present invention will be explained with reference to FIG. 2. The mobile telephone terminal apparatus 10 of the present invention is provided with an antenna 11 for a wireless telephone communication for carrying out a wireless communication with a base station for a wireless telephone. The antenna 11 is connected to a communication circuit 12 for a wireless telephone communication so as to carry out a wireless communication with the base station under a control of a control unit 19. When a communication for a telephone call is carried out in the communication circuit 12, received sound data are supplied to a sound data processing unit 13 so as to perform a receiving process of the sound data and thereafter, they are supplied to a speaker 14 to be outputted and also, sound data for transmission which are picked up by a microphone 15 and processed in the sound data processing unit 13 are supplied to the communication circuit 12 to be transmitted.

The mobile telephone terminal apparatus 10 is provided with a display unit 16 constituted by a liquid crystal display or the like and an operation unit 17 constituted by operation keys or the like. It is possible to display a mail sentence, a picture screen accessed to the web or the like on the display unit 16 an input operation of a telephone number, a mail sentence or the like and various mode settings or the like can be carried out by an operation unit 17. Here, it is constituted such that a communication process is carried out in a communication circuit 32 for short distance which will be described later on and in a case when its communication state is in a connection mode in which a connection process with a communication partner is carried out and when the control unit 19 detects that any one of the keys constituting the operation unit 17 or the like was operated, a process for transmitting a signal (page signal) compulsorily asking for a response with respect to the partner. This concrete process example will be described later on.

It is constituted such that respective blocks of the terminal apparatus 10 are connected with the control unit 19 or the like by way of a control line 25 and also can carried out a data transfer by way of the data line 26 so as to store necessary data in the memory 18. In the memory 18, not only data necessary as a mobile telephone terminal are stored but also it is possible to store data necessary in an IC card function unit 40 which will be described later on. Also, a necessary data saving for executing a program and/or for realizing the security function thereof can be carried out in the memory 18.

Also, the mobile terminal apparatus 10 is provided with a vibration unit 21 constituted by a vibration motor or the like which vibrates the terminal itself for carrying out notification of receiving signal by way of the telephone line to this terminal apparatus 10 and various warnings and a light emitting unit 22 constituted by a light emitting diode or the like. Then, the vibration and the light emission are carried out under a control of the control unit 19. These vibration unit 21 and light emitting unit 22 are used as notification means for notifying receiving signal or the like for the mobile telephone terminal and they are used also for necessary warning means as a security function. It should be noted that it is possible to output warning sound from the speaker 14 or the like in a case when sound is to ring as necessary warning means in the security function.

Then, the mobile telephone terminal 10 of the present invention is provided with a communication circuit 32 for short distance wireless communication in addition to the communication circuit 12 for telephone communication. Then, it is carried out by using this communication circuit 32 a wireless communication with a partner within a relatively narrow region of, for example, around from several meters to hundred meters at the maximum by way of a connected antenna 31 (however, it is constituted such that a process for narrowing the communication possible region is to be executed when carrying out a communication during a normal period with the wireless key apparatus as will be described later on). Here, for example, a wireless communication system for short distance referred to as Bluetooth® is applied. In this short distance wireless communication, various kinds of use applications are supposed such, for example, that a communication is carried out with a head set for a hands-free telephone call or a communication with a personal computer apparatus is carried out through the mobile telephone terminal apparatus 10. As to the frequency band used for the wireless communication, for example, 2 GHz band is used, it is constituted such that a frequency band or modulation system which does not intervene in the wireless telephone communication in the communication circuit 12 is employed. According to this constitution, it is possible to carry out the wireless telephone communication in the communication circuit 12 and the communication in the communication circuit 32 for short distance wireless communication at the same time.

In case of this example, a wireless communication is carried out with a wireless key apparatus 50 by using this communication circuit 32 for short distance communication. However, a wireless communication is possible also with an apparatus (head set, personal computer apparatus or the like) other than the wireless key apparatus 50 if it is a communication apparatus of the same communication system. Also, in a case when a security function is executed, the wireless key apparatus 50 carrying out a wireless communication by the communication circuit 32 is to be limited to a specific one apparatus. For that purpose, for example, identification ID or the like of the apparatus is to be registered in the memory 18 or the like beforehand. With respect to registered information relating to this wireless key apparatus 50, it may be constituted such that a user cannot revise it.

A transmission amplifier 33 which amplifies the transmission signal in the communication circuit 32 is constituted such that transmission power is to be set in a plurality of steps by the control of the control unit 19 or the like. Also, in a state in which it is wireless-connected with the wireless key apparatus 50, it is constituted such that low transmission power among the plurality of steps is to be set. Further, in a state in which it is connected with an apparatus other than the wireless key apparatus 50, transmission power of a relatively high step is to be set. It should be noted in a case when it is wireless-connected with an apparatus installed a function for a wireless key apparatus such as a head set which will be described later on that the transmission power is to be set depending on the operation state of the partner apparatus at that time (more specifically, depending on whether or not it is operated only as a wireless key apparatus or whether or not combined another function is operated).

Also, it is constituted in the communication circuit 32 of the present invention such that a measurement unit 34 of strength of the received electric field is included and strength of the received electric field of a signal (RSSI) received by the communication is circuit 32 is to be measured so as to obtain a received power value. The received power value measured by the measurement unit 34 of the strength of the received electric field is used in the communication circuit 32 for the judgment or the judgment for presuming of a wireless communication state or a wireless communication distance. Consequently, it becomes a constitution in case of the present invention such that the communication circuit 32 is provided with judgment means for judging or presuming a wireless communication state or a wireless communication distance.

The mobile telephone terminal 30 of the present invention is provided with a non-contacting IC card function unit 40. The non-contacting IC card function unit 40 includes a billing data control unit 41 connection with an antenna 42 and an adjacent wireless communication in a very adjacent distance of around several centimeters is carried out with reader and writer. In this adjacent wireless communication, it is possible to operate the billing data control unit 41 by means of the power obtained by receiving a radio wave from the reader and writer side, but according to this example, it is constituted such that the billing data control unit 41 is to be operated by the power supply supplied from a power supply circuit 24 in the mobile telephone terminal 10.

When the IC card function is executed, the billing data control unit 41 reads out data necessary for billing or authentication from the memory 18 (or a memory in the billing data control unit 41 (not shown)) and an exchange of the read out data is carried out with the reader and writer by an adjacent wireless communication. For example, in a case when it is functioned as a boarding ticket of transport facilities, it is constituted such that the billing data control unit 41 transmits data charged amount of money or the like which is possible to be paid by direct debit for an effective zone and an effective period as a boarding ticket (commutation ticket) or as a boarding ticket or personal information or the like relating to a person possessing this terminal (IC card) to the reader and writer so as to carry out a billing process or an authentication process. In case of using an employee ID card, a membership card, a card for price settlement, a credit card or the like, necessary information for its authentication is also exchanged.

Further, it is constituted such that the mobile telephone terminal apparatus 10 of the present invention is provided with a terminal unit 23 and various peripheral apparatuses, data process apparatuses which are not shown or the like can be connected directly thereto by way of this terminal 23. In this case, it is constituted such that power supply can be applied to external apparatuses connected by means of the terminal unit 23 from the power supply circuit 24 installed with a secondary battery or the like which applies power supply to respective portions in the mobile telephone terminal apparatus 10. For example, as shown by an arrow J of a dotted line in FIG. 1, it is constituted in a case when the terminal unit 56 of the wireless key apparatus 50 and the terminal unit 23 of this mobile telephone terminal apparatus 10 are connected directly such that it is possible to supply power to a secondary battery in the wireless key apparatus 50 from the power supply circuit 24 in the mobile telephone terminal apparatus 10 so as to charge it. Also, it is constituted in a case when the wireless key apparatus 50 is connected directly to the terminal unit 23 of the mobile telephone terminal apparatus 10 such that the control unit 19 of the mobile telephone terminal apparatus 10 detects that fact and a security process when directly connected (for example, security process executed without short distance wireless communication which will be described later on) is to be carried out.

Figure 3:
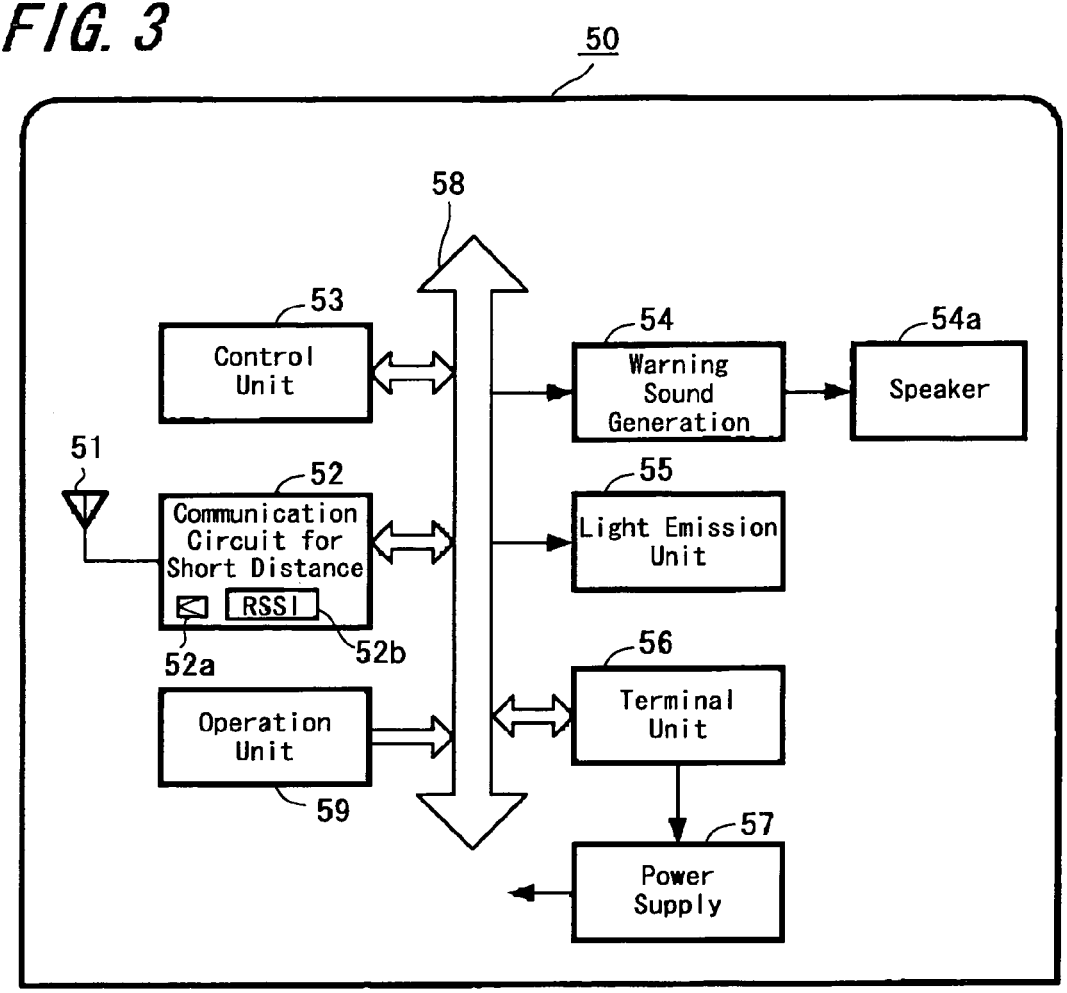
FIG. 3 is a block diagram showing a constitutional example of a wireless key apparatus according to a first exemplified embodiment of the present invention.

Next, it will be explained with respect to the constitution of the wireless key apparatus 50 which carries out a wireless communication with the mobile telephone terminal apparatus 10 according to the present invention with reference to FIG. 3. The wireless key apparatus 50 of the present invention is provided with a communication circuit 52 for short distance wireless communication. Then, by using this communication circuit 52, a wireless communication is carried out with a partner in a relatively narrow region of, for example, around several meters and at the maximum hundred meters by way of a connected antenna 51 (however, it is constituted when communication is carried out normally with the mobile telephone terminal apparatus 10 such that a process for narrowing the communication possible region is executed). Here, it is constituted such that Bluetooth system which is a short distance wireless communication system provided on the mobile telephone terminal apparatus 10 side is also applied to the wireless key apparatus 50. The partner carrying out a wireless communication by the communication circuit 52 is limited to a specific one of the mobile telephone terminal apparatus 10. For that purpose, for example, the identification ID or the like of its apparatus was registered beforehand. With respect to the registered information as to the mobile telephone terminal apparatus 10, it may be constituted such that a user cannot revise it.

With respect to the wireless communication in the communication circuit 52, it is executed under a control of a control unit 53. In this case, it is constituted such that transmission power is to be set in a plurality of steps in a transmission amplifier 52a which amplifies a transmission signal in the communication circuit 52 under a control of the control unit 53 or the like. Also, in a state where it is wireless-connected with the mobile telephone terminal apparatus 10, a low transmission power is to be set in the plurality of steps. However, it is constituted in a case when the control unit 53 detects that an operation unit 59 (button shaped operation unit or the like as shown in FIG. 1) arranged in the wireless key apparatus 50 is operated such that the transmission power is to be heightened temporarily in the transmission amplifier 52a and a transmission process of a signal (page signal or the like) for making the partner recognize it compulsorily is to be carried out.

It is constituted in the communication circuit 52 of the present invention such that a measurement unit 52b of the strength of the received electric field is included and the strength of the received electric field of a signal (RSSI) received by the communication circuit 52 is measured so as to obtain a received power value. The received power value measured by the measurement unit 52b of the strength of the received electric field is used in the communication circuit 52 for the judgment or the judgment for presuming of a wireless communication state or a wireless communication distance. Consequently, it becomes a constitution in case of the present invention such that the communication circuit 52 is provided with judgment means for judging or presuming a wireless communication state or a wireless communication distance.

The wireless key apparatus 50 of this example is provided with a warning sound creation unit 54 connected with a speaker 54a for outputting warning sound and a light emitting unit 55 constituted by a light emitting diode or the like. Then, output of the warning sound, vibration and light emission are carried out under the control of the control unit 53. These warning sound creation unit 54 and light emitting unit 55 are used as warning means necessary for security function. Also, it is constituted such that the light emitting unit 55 functions also as display means which displays the security mode at present in a state where a wireless communication is carried out with the mobile telephone terminal apparatus 10 and the security function is operated. Specifically, for example, the light emitting unit 55 functions also as display means for displaying a security mode by changing the display such that when the light emitting unit 55 is blinking in green, it indicates that it is in a normal mode and when it is blinking in red, it indicates that it is in a warning mode, when there is no display at all, it indicates that it is in a function limitation mode, or the like. The display means for displaying the security mode may be constituted such that a liquid crystal display or the like is used and a display where modes can be recognized directly by characters and figures or the like is carried out. Also, it may be constituted as warning means for warning by vibration.

It is constituted such that the control unit 53 and each unit is connected by means of a control line 58 and a wireless communication in the communication circuit 52, operations in the warning sound creation unit 54 and the light emitting unit 55 and the like are executed under a control of the control unit 53.

Also, it is constituted such that the wireless key apparatus 50 of the present invention is provided with a terminal unit 56 and the mobile telephone terminal apparatus 10 can be connected directly by using this terminal 56. When connected thereof, the control unit 53 in the wireless key apparatus 50 carries out a data transfer directly with the control unit 19 in the mobile telephone terminal apparatus 10 and carries out a security process when directly connected without carrying out a short distance wireless communication. Also, in a case when remaining charge amount of the secondary battery installed in a power supply circuit 57 in the wireless key apparatus 50 is small, it is possible to charge the secondary battery in the power supply circuit 57 by an power supplied from the side of the mobile telephone terminal apparatus 10.

Figure 4:
FIG. 4 is an explanatory diagram showing a usage example according to a first exemplified embodiment of the present invention.

When the mobile telephone terminal apparatus 10 and the wireless key apparatus 50 constituted in this manner are used, a user always carries the wireless key apparatus 50 as shown, for example, in FIG. 4. Then, it is constituted such that when the user uses the mobile telephone terminal apparatus 10, the function is not to be limited (normal mode which will be described later on). Then, in a case when a user goes away from the mobile telephone terminal apparatus 10 by a distance of a certain degree after putting the mobile telephone terminal apparatus 10 somewhere in a state where the wireless key apparatus 50 is always maintained to be carried, a warning operation is executed from the wireless key apparatus 50 (warning mode which will be described later on). If he stays away from the mobile telephone terminal apparatus 10 in a state where the warning operation is executed, it becomes a state where the function of the mobile telephone terminal apparatus 10 is limited (function limitation mode which will be described later on). It should be noted with respect to the warning operation in a warning mode that it may be constituted such that it is to be carried out only on the side of the mobile telephone terminal apparatus 10. Alternatively, it may be constituted such that the warning operation in the warning mode is to be carried out in both of the wireless key apparatus 50 and the mobile telephone terminal apparatus 10.

With respect to a function of the mobile telephone terminal apparatus 10 which is limited in a function limitation mode, it is a choice, for example, to direct to all of the functions of the mobile telephone terminal apparatus 10 (however, communication function related to security function is not to be limited) and it is another choice to direct to a partial function within the function which the terminal apparatus 10 is provided with. Specifically, it may be constituted, for example, such that only the process using the non-contacting IC card function unit 40 is to be limited. Also, it may be constituted such that address book inspection of the mobile telephone terminal apparatus 10, display of personal information of mail inspection or the like is to be limited. Also, it may be constituted such that only the reception of a signal can be allowed while the transmission as a wireless telephone is to be limited. Also, it may be constituted such that only the reception of a signal can be allowed while the transmission as a wireless telephone is to be limited. In this case, it may be constituted such that only the telephone number for emergency announcement to a police station or the like can be transmitted. Also, it may be constituted such that a process using the non-contacting IC card function unit 40 is not to be limited while only the function as a wireless telephone apparatus is to be limited.

The wireless key apparatus 50 explained so far was constituted as an apparatus for exclusive use which carries out only the security function, but it should be noted that it may be constituted such that it is to be mounted on an apparatus having other function. For example, it may be constituted such that a wireless key apparatus is to be mounted on a head set for carrying out a wireless communication of Bluetooth system with the mobile telephone terminal apparatus 10 and carrying out a so-called hands-free telephone call.

Figure 5:
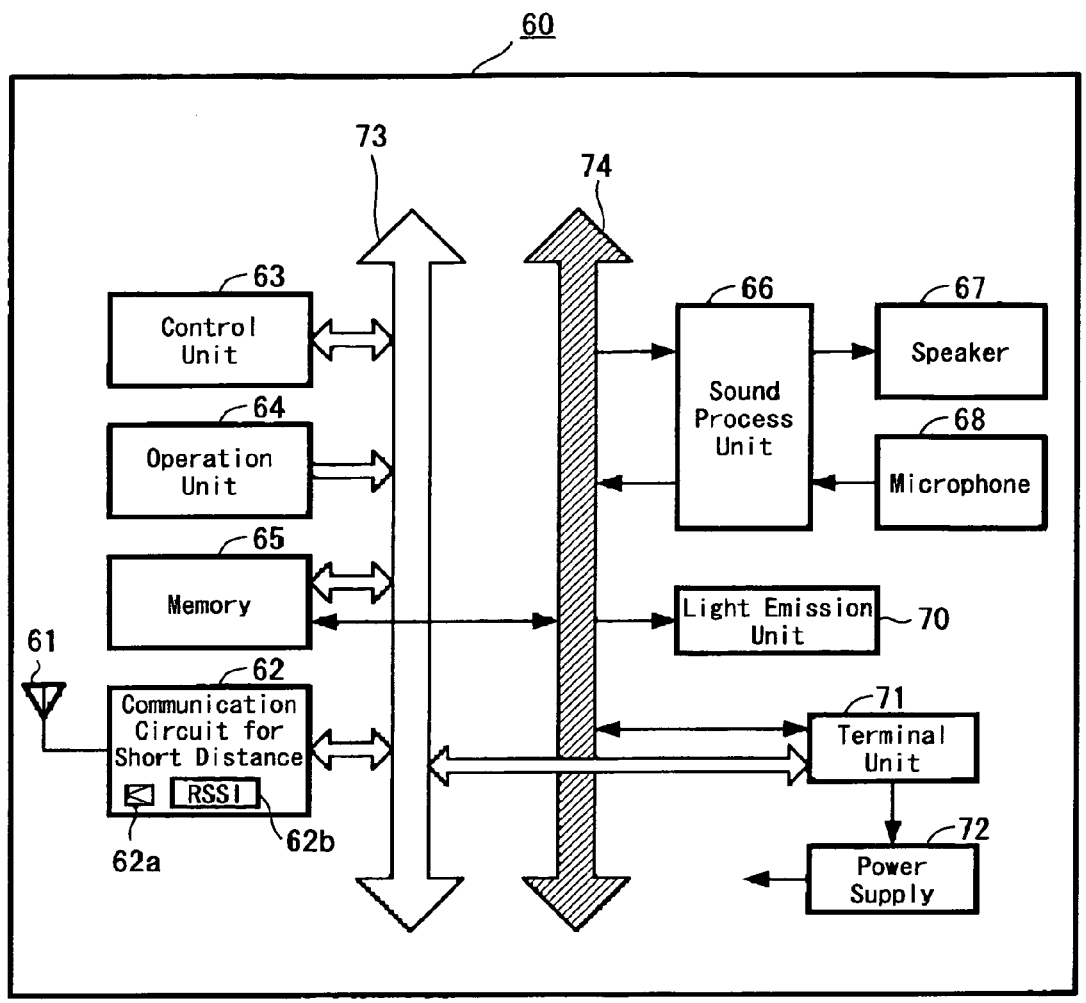
FIG. 5 is a block diagram showing a modified example of a wireless key apparatus (example integrated with head set) according to a first exemplified embodiment of the present invention.

FIG. 5 is a diagram showing a constitutional example of a head set with this wireless key. A head set with a wireless key 60 according to the present invention is provided with a communication circuit 62 for short distance wireless communication. This communication circuit 62 carries out a wireless communication with a partner in a relatively narrow region of, for example, around several meters and at the maximum hundred meters by way of a connection antenna 61. Here, Bluetooth system which is the same system as the short distance wireless communication system provided on the side of the mobile telephone terminal apparatus 10 is applied also to the communication circuit 62 of the head set with the wireless key. The partner carrying out a wireless communication by the communication circuit 62 is limited to the specific one of the mobile telephone terminal apparatus 10 which was registered. For that purpose, for example, identification ID of the apparatus or the like is registered beforehand. However, it may be constituted when using only the head set such that there is no limitation for the partner whom the communication circuit 62 carries out a wireless communication.

With respect to the wireless communication in the communication circuit 62, it is executed under a control of the control unit 63. In this case, it is constituted such that transmission power for the transmission amplifier 62a which amplifies the transmission signal in the communication circuit 62 is to be set under a control of the control unit 63 or the like.

When a communication for the head set (more specifically, sound data communication for a telephone call) is carried out in the communication circuit 62, received sound data are supplied to a sound data processing unit 66 and a receiving process of the sound data is performed. Thereafter, they are supplied to a speaker 67 and outputted. Also, sound data picked up by a microphone 68 are processed in the sound data processing unit 66 so as to become sound data for transmission. Then, the sound data for transmission are supplied to the communication circuit 62 and transmitted.

It is constituted in the communication circuit 62 of the present invention such that a measurement unit 62b of the strength of the received electric field is included and the strength of the received electric field of a signal (RSSI) received by the communication circuit 62 is measured so as to obtain a received power value. The received power value measured by the measurement unit 62b of the strength of the received electric field is used in the communication circuit 62 for the judgment or the judgment for presuming of a wireless communication state or a wireless communication distance. Consequently, it becomes a constitution in case of the present invention such that the communication circuit 62 is provided with judgment means for judging or presuming a wireless communication state or a wireless communication distance.

In addition, the head set with the wireless key 60 of the present invention is provided with an operation unit 64 constituted by operation keys or the like, a memory 65 and a light emitting unit 70. The light emitting unit 70 is used as warning means relating to the security function and at the same time used also as display means of operation state on the occasion when it is functioned as a head set. These respective units in the head set 60 can carry out exchange of control data by way of a control line 73. Further, the respective units can carry out exchange of sound data or the like by way of a data line 74.

Also, the head set with the wireless key 60 of the present invention is provided with a terminal unit 71 and it is constituted such that the mobile telephone terminal apparatus 10 can be connected directly by means of this terminal 71. When connected with the mobile telephone terminal apparatus 10 directly, it is constituted such that the control unit 63 in the head set with the wireless key 60 carries out a data transfer directly with the control unit 19 in the mobile telephone terminal apparatus 10 and a direct sound data transfer or a security process is to be carried out without a short distance wireless communication. Also, in a case when remaining charge amount of a secondary battery installed in a power supply circuit 72 in the head set with the wireless key 60 is small, it is possible to charge the secondary battery in the power supply circuit 72 by an power supplied from the side of the mobile telephone terminal apparatus 10.

Figure 6:
FIG. 6 is an explanatory diagram showing a usage example of the example in FIG. 5.

In a case when such a head set with a wireless key 60 is prepared, as shown, for example, in FIG. 6, a user putting on the head set with the wireless key 60 can carry out a so-called hands-free telephone call depending on a fact that the mobile telephone terminal apparatus 10 which remains inside a bag or the like and the head set with the wireless key 60 carries out a wireless communication. Further, with respect to a function as a wireless key apparatus, a warning and a function limitation of the mobile telephone terminal apparatus 10 are executed according to position relationship (distance) between the head set with the wireless key 60 and the mobile telephone terminal apparatus 10. More specifically, in a case when the mobile telephone terminal apparatus 10 goes away from the head set with the wireless key 60 to a certain degree of distance, the head set with the wireless key 60 or the mobile telephone terminal apparatus 10 (alternatively, both sides) carries out a warning operation (warning mode which will be described later on). Then, if the user stays away from the mobile telephone terminal apparatus 10 in the state in which this warning operation was carried out, it becomes a state in which the function of the mobile telephone terminal apparatus 10 is limited (function limitation mode will be described later on).

Next, it will be explained with reference to FIGS. 7 to 19 with respect to a fundamental process example in a case when the mobile telephone terminal apparatus 10 and the wireless key apparatus 50 having such a constitution is prepared and a security process is carried out. It should be noted in the following explanation that it will be explained on the assumption that the wireless key apparatus 50 is to be used but a security process in a case when the head set 60 with the wireless key is used is also similar fundamentally.

First, it will be explained with reference to FIG. 7 with respect to a security process mode (hereinafter designates as security process mode). It is constituted in case of this example such that there are prepared a normal mode M1 which does not limit the function of the mobile telephone terminal apparatus 10, a warning mode M2 for warning that it gets out of the normal mode caused by a fact that the distance between the mobile telephone terminal apparatus 10 and the wireless key apparatus 50 goes away or the like and a function limitation mode M3 for limiting the function of the mobile telephone terminal apparatus 10 in a case when it does not return to from the warning mode to the normal mode (more specifically, in a case when the distance between the mobile telephone terminal apparatus 10 and the wireless key apparatus 50 remains in a far state).

Figure 7:
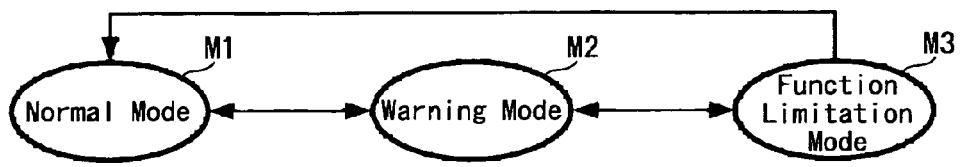
FIG. 7 is an explanatory diagram showing a setting example of a security mode according to a first exemplified embodiment of the present invention.

With respect to the transition of these modes, there are, as shown by arrows in FIG. 7, a change from the normal mode M1 to the warning mode M2 and a change from the warning mode M2 to the function limitation mode M3 and further, it returns to the normal mode M1 if the wireless key apparatus 50 approaches the mobile telephone terminal apparatus 10 in a state in which it became the function limitation mode M3. Further, it returns to the normal mode M1 if the wireless key apparatus 50 approaches the mobile telephone terminal apparatus 10 in a state in which it became the warning mode M2 and the warning operation is carried out.

Figure 8:
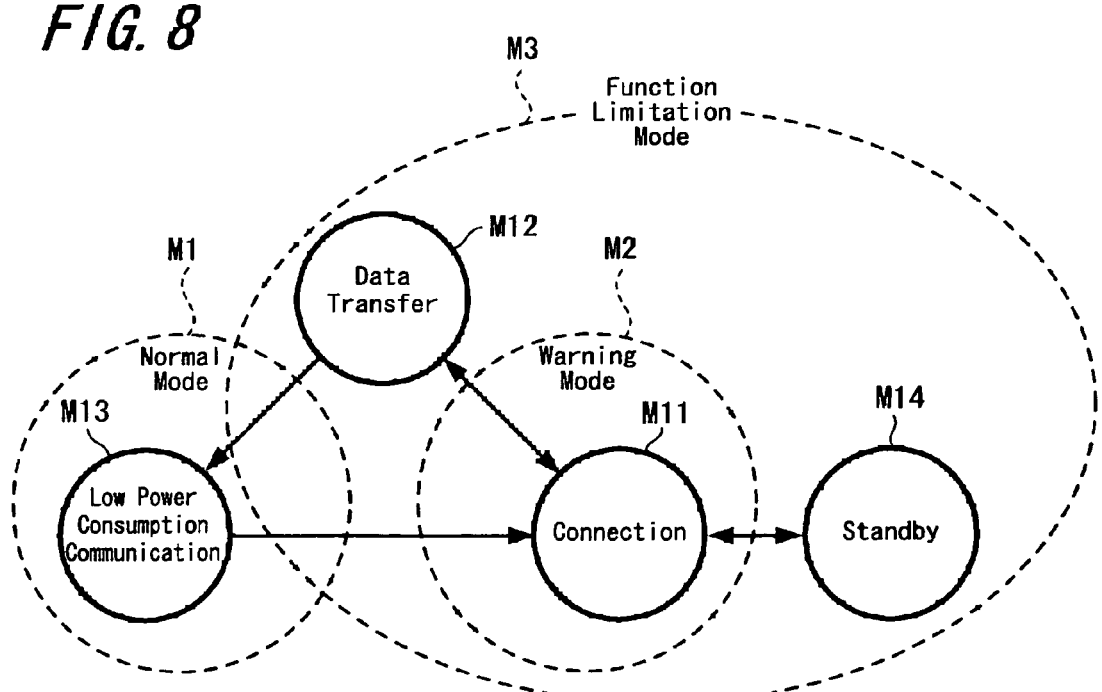
FIG. 8 is an explanatory diagram showing a transition example of a security mode by a communication mode according to a first exemplified embodiment of the present invention.

In case of the present invention, these security modes are made to have relation with the communication modes prepared in the Bluetooth system which is a wireless communication system between the mobile telephone terminal apparatus 10 and the wireless key apparatus 50. More specifically, as communication modes in the wireless communication system (Bluetooth system) of this example are shown in FIG. 8, there is a connection mode M11 for authenticating and wireless-connecting the partner apparatus in both of the mobile telephone terminal apparatus 10 and the wireless key apparatus 50 and when authentication is completed mutually and connection is carried out in the connection mode M11, it becomes a data transfer mode M12 in which payload data transfer is carried out practically. When the data transfer is completed in the data transfer mode M12, it is shifted to a low power consumption communication mode M13. In this low power consumption communication mode M13, the wireless communications of both sides are carried out intermittently by a cycle longer than a communication cycle in the data transfer mode M12 and it becomes a state in which the wireless connection between the both sides is maintained. Owing to the fact that the cycle carrying out the intermittent communication is long in this manner, it becomes possible to make the power consumption required for the communication smaller than a case in which it is operated in the data transfer mode M12 and low power consumption is realized. It should be noted that the low power consumption here indicates a phenomenon that the low power consumption is realized by thinning out communication cycles and is not related directly to the process for lowering the transmission power which will be described later on (however, it is constituted as described later on such that a process for lowering transmission power is carried out during a low power consumption mode).

In a case when the data transfer between the both sides is to be restarted in a state of this low power consumption communication mode M13, it returns to the connection mode M11, a process for restarting the communication is carried out in the connection mode M11 and thereafter it becomes the data transfer mode M12 in which the data transfer is carried out practically. In a state in which the wireless connection is maintained in the low power consumption communication mode M13, the connection process in the connection mode M11 is carried out relatively simply and it is possible to carry out the restart of the data transfer rapidly as compared with a case in which the wireless connection is recommenced.

Also, in a case when a connection process with any one of communication partners is not carried out in the connection mode M11 (or in a case when a connection is not possible), each apparatus is shifted to the standby mode M14. The apparatus which becomes this standby mode M14 carries out an intermittent reception or transmission with a very long cycle and carries out a process for searching whether or not a communication apparatus to become a partner exists. Here, it may be constituted such that the apparatus becoming the standby mode M14 does not return to the connection mode M11 if there is no process which may become some kind or another opportunity caused by a user operation or the like. Also, during a period when a communication is carried out between two apparatuses, the two apparatuses are to be set in the same mode basically. More specifically, at least the connection mode M11, the data transfer mode M12 and the low power consumption mode M13 are the modes which shift in synchronism with each other between the two apparatuses.

Here, in case of the present invention, as shown in FIG. 8, the normal mode M1 is set as a security mode when it is a state in which it communicated between the mobile telephone terminal apparatus 10 and the wireless key apparatus 50 in the low power consumption communication mode M13 and a warning mode is started by an opportunity that the communication mode shifts from the low power consumption communication mode M13 to the connection mode M11. The process with respect to the detail in which it is shifted from a warning mode to a function limitation mode will be described later on, but when the security mode becomes the function limitation mode M3, the function limitation mode M3 remains during a period when it is the connection mode M11, the data transfer mode M12 and the standby mode M14. It is constituted only in a case when it is shifted from the data transfer mode M12 to the low power consumption communication mode M13 such that the security mode is to return from the function limitation mode M3 to the normal mode M1.

Figure 9:
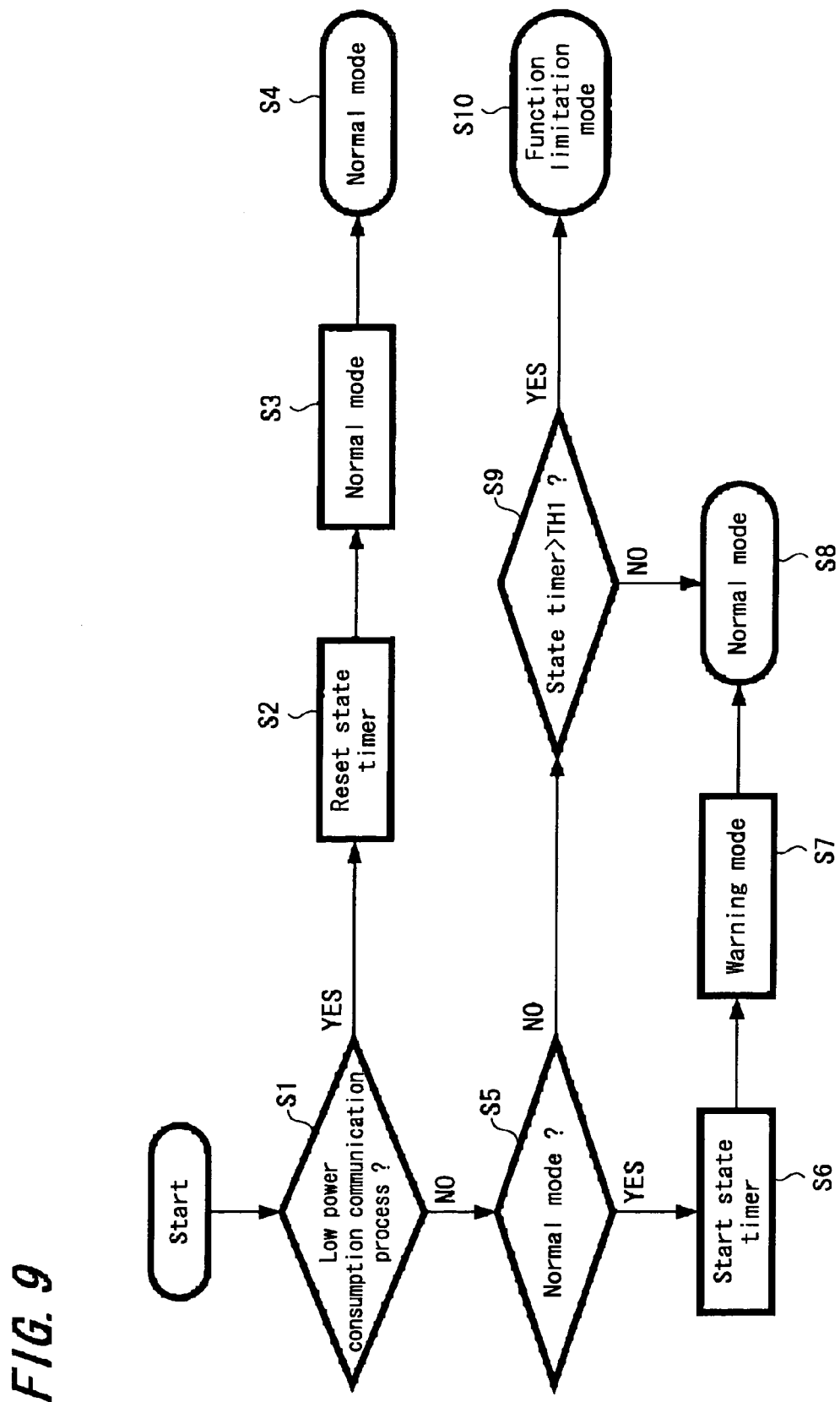
FIG. 9 is a flowchart showing a mode selection process example according to a first exemplified embodiment of the present invention.

Next, it will be explained a process in which the security mode is selected in each of the mobile telephone terminal apparatus 10 and the wireless key apparatus 50 with reference to FIG. 9. This security mode selection process is, for example, executed under the control of the control units 19 and 53 of the respective apparatuses.

First, it is judged whether or not the communication mode at present is in a low power consumption communication mode (step S1). Here, in a case when it is in a low power consumption communication mode, a state timer prepared in the control unit is reset (step S2). Then, the security mode is set to a normal mode (step S3) and a process as a normal mode (more specifically, a mode without limiting the function) is executed (step S4). It should be noted that the state timer is a timer counted up by passage of time.

Also, in a case when it is judged in step S1 that it is not in a low power consumption communication mode, it is judged whether or not the security mode just before (at present) is a normal mode (step S5). Here, in case of a normal mode, a state timer prepared in the control unit is made to start (step S6). Then, a start of a warning mode is set (step S7) and a warning operation as a warning mode is executed (step S8). It should be noted that in a case when it is constituted such that only one of the mobile telephone terminal apparatus 10 and the wireless key apparatus 50 carries out the warning operation, any process is not carried out particularly in the other apparatus during the warning mode.

Then, in a case when it is judged in step S5 that the security mode just before (at present) is not a normal mode, it is judged whether or not the counted value of the state timer activated in step S6 exceeds a value TH determined beforehand (step S9). It remains in the warning mode of step S8 until the counted value exceeds the predetermined value TH1 and in a case when the counted value exceeds the predetermined value TH1, it is made to change the security mode to a warning mode (step S10). It is designed such that the period when the counted value of the state timer exceeds the predetermined value TH1 after the count is started is a period, for example, of around several seconds to several ten seconds.

Next, it will be explained with reference to the drawings of FIG. 10 and subsequent thereto about a specific example of a communication state in each communication mode in each of the mobile telephone terminal apparatus 10 and the wireless key apparatus 50. First, it will be explained an example in which the mobile telephone terminal apparatus 10 and the wireless key apparatus 50 carry out the authentication process of a partner in the connection mode M11. In case of carrying out a wireless communication by Bluetooth system, one of the communication apparatus of the two apparatuses carrying out the communication becomes a master apparatus and the other communication apparatus becomes a slave apparatus. For the Bluetooth system, either one of the apparatuses may become a master or a slave, but in case of the present invention, it is to be set such that the wireless key apparatus 50 becomes a master and the mobile telephone terminal apparatus 10 becomes a slave.

The apparatus which became a slave (mobile telephone terminal apparatus 10 here) carries out a scan process for searching the master in a connection mode. FIG. 10 is a flowchart showing an operation example in this scan process. In the scan process, continuous reception is carried out for a constant period and a process for searching a signal from the master is carried out (step S11). It is judged in its scan process whether or not a signal (page signal) added with an ID number of the wireless key apparatus 50 which is a partner carrying out the security process was received (step S12). Here, in a case when signal added with the ID number of the wireless key apparatus 50 is not received, it is shifted to an idle process so as to wait for a constant period (step S13) and thereafter it returned to step S11 such that the scan process is repeated.

Then, in a case when it is judged in step S12 that the page signal added with the ID number of the wireless key apparatus 50 was received, a response signal with respect to that page signal is transmitted (step S14) and it is shifted to a communication state by carrying out a connection process with the master (more specifically, shifted to a data transfer mode M12) (step S16).

Next, FIG. 11 will be explained. The apparatus which became a master (here, wireless key apparatus 50) starts a standby timer when the connection mode starts (step S21). A page signal is transmitted by a determined channel for a predetermined period (step S22). At that time, for example, an ID number which was set for the own apparatus is added to the page signal and at the same time, the ID number of the communication partner is also added. Then, it is judged whether or not there is a response from the slave after the transmission of the page signal (step S23). In case of no response, it is judged whether or not the counted value of the standby timer exceeds a determined time period TH2 (step S24). In a case when the counted value of the standby timer does not exceed the determined time period TH2, it is shifted to an idle process and it waits for a constant period (step S25) and thereafter, it returns to step S22 and the transmission process of the page signal is repeated.

Then, in a case when it is judged in step S23 that there is a response from the slave, a connection process with the slave is performed and it is shifted to a communication state (more specifically, shifted to a data transfer mode) (step S27). Also, in a case when the counted value of the standby timer exceeds the determined time period TH2 in step S24, it becomes a standby state (step S28) and a process for attempting a connection with the slave here is discontinued.

Figure 10:
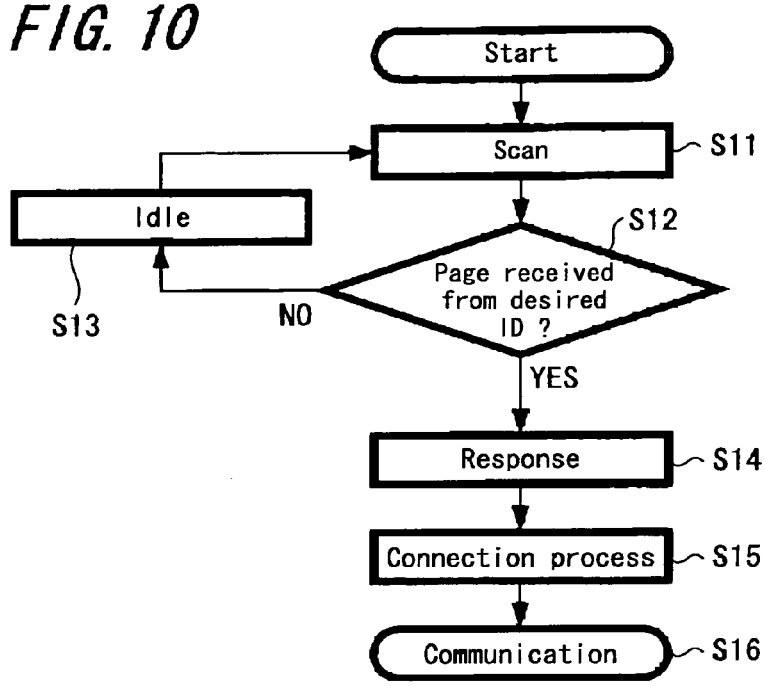
FIG. 10 is a flowchart showing a scanning process example according to a first exemplified embodiment of the present invention.
Figure 11:
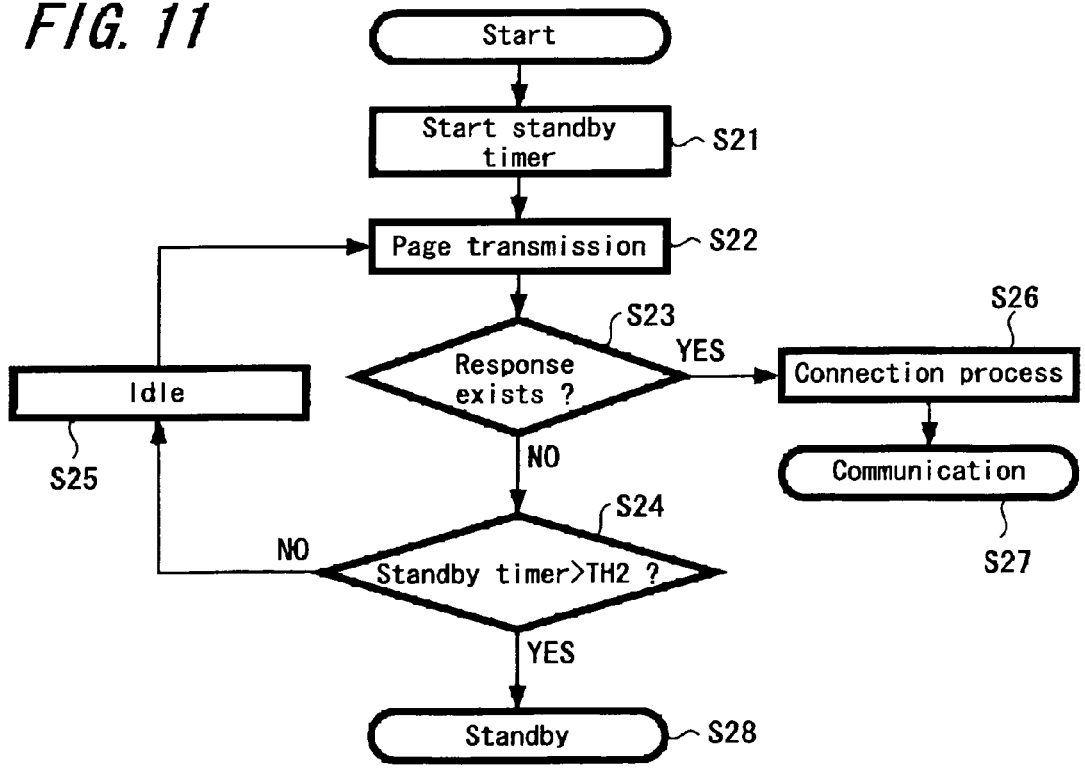
FIG. 11 is a flowchart showing a page transmission process example according to a first exemplified embodiment of the present invention.

FIGS. 12A and 12B are diagrams showing an example of a communication state between the apparatus which became the master (wireless key apparatus 50) in which the process of the flowchart in FIG. 11 is carried out and the apparatus which became the master slave (mobile telephone terminal apparatus 10) in which the process of the flowchart in FIG. 10 is carried out. FIG. 12A shows a transmission timing of the page signal and an idle period of the master (wireless key apparatus 50). FIG. 12B shows a receiving (scan) timing and an idle period of the slave (mobile telephone terminal apparatus 10). As shown in FIGS. 12A and 12B, the idle period of the transmission side and the idle period of the receiving side are different from each other and it is constituted such that the page signal transmitted at any one of timings can be received on the receiving side.

Figure 12:
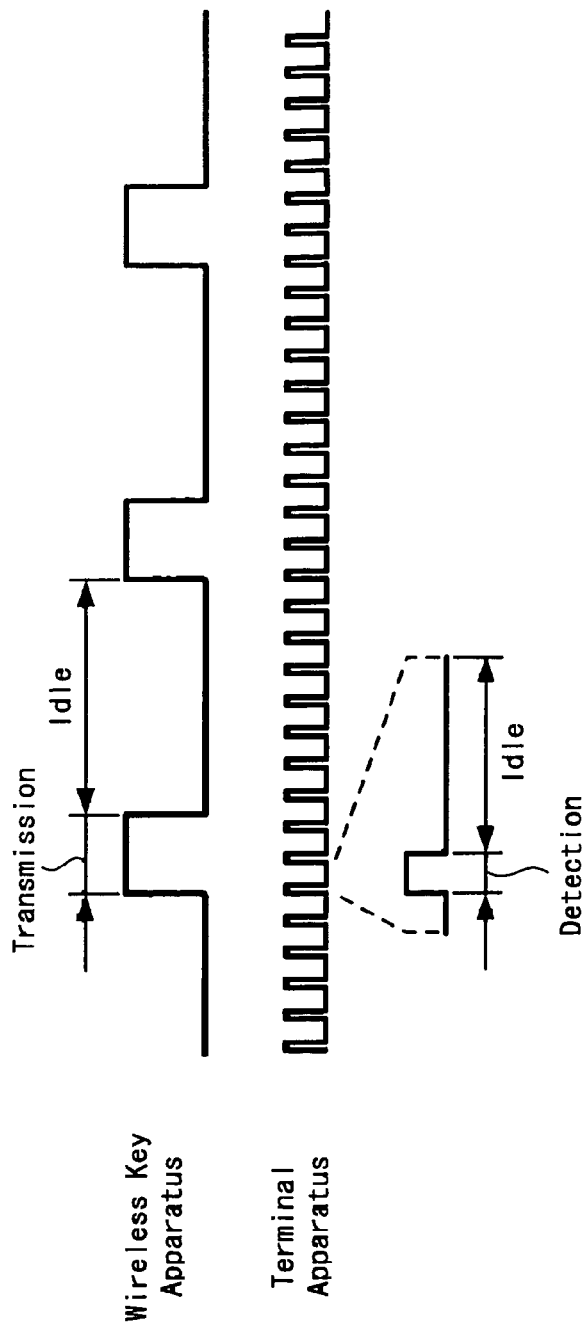
FIGS. 12A and 12B are timing diagrams showing an example of a process state of a page transmission and a scanning according to a first exemplified embodiment of the present invention.
Figure 13:
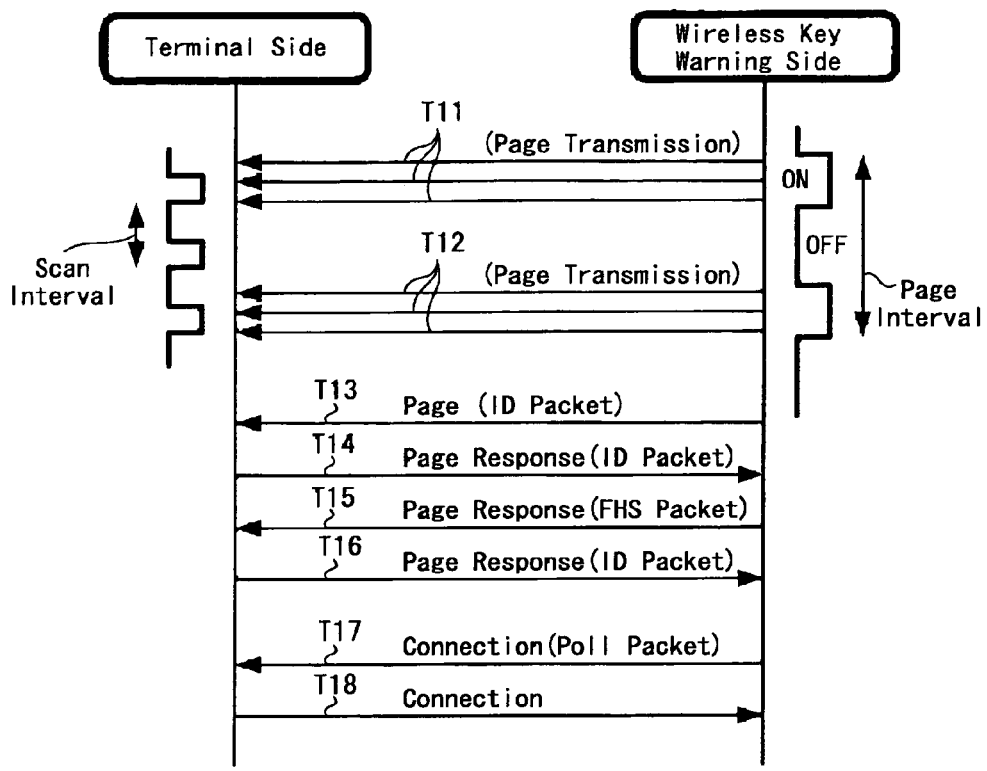
FIG. 13 is a sequence diagram showing an example of a connection state according to a first exemplified embodiment of the present invention.

FIG. 13 is a diagram showing the process of FIG. 12 by a sequence diagram. As shown in FIG. 13, the transmission of the page signal is carried out from the wireless key apparatus 50 intermittently (at timing T11, T12, T13). Here, if there is a response with respect to the page signal (at timing T14), mutual exchange of the response between the two apparatuses are further carried out (at timing T15, T16), thereafter mutual exchange of the connection signal performing the wireless connection is carried out (at timing T17, T18) and it is shifted to a data transfer mode.

Next, a process example in a case when the respective apparatuses of the present invention are shifted to the data transfer mode M12 will be explained with reference to a flowchart of FIG. 14. When it is shifted to a data transfer mode, an authentication process in a channel in which the data transfer is carried out is performed (step S31). Then, it is judged whether or not the authentication was completed correctly (step S32). In a case when the authentication process is not completed here, it returns to the connection mode M11.

Then, in a case when the connection process in step S32 is completed, a data transfer is carried out ordinarily, but in the security process of the present invention, the data transfer is not carried out and a process for shifting to a low power consumption mode M13 is carried out directly (step S33). Then, it is judged whether or not it can be shifted to a low power consumption mode (step S34). In case of a state in which it can be shifted to a low power consumption mode M13, it is set to a sniff state of a low power consumption mode M13. In a case when it cannot be shifted to a low power consumption mode, it returns to the connection mode M11.

Figure 14:
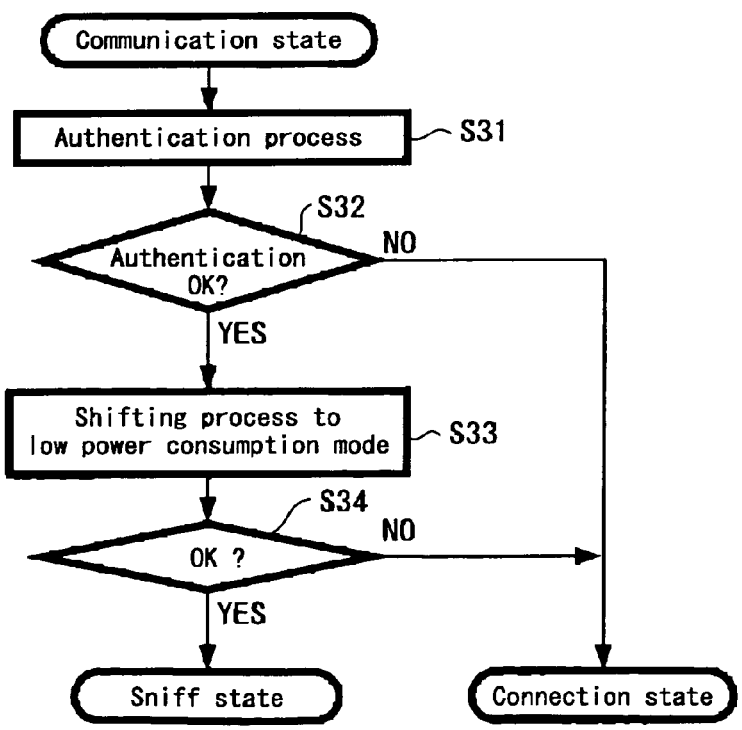
FIG. 14 is a flowchart showing a shifting process example for a low power consumption according to a first exemplified embodiment of the present invention.
Figure 15:
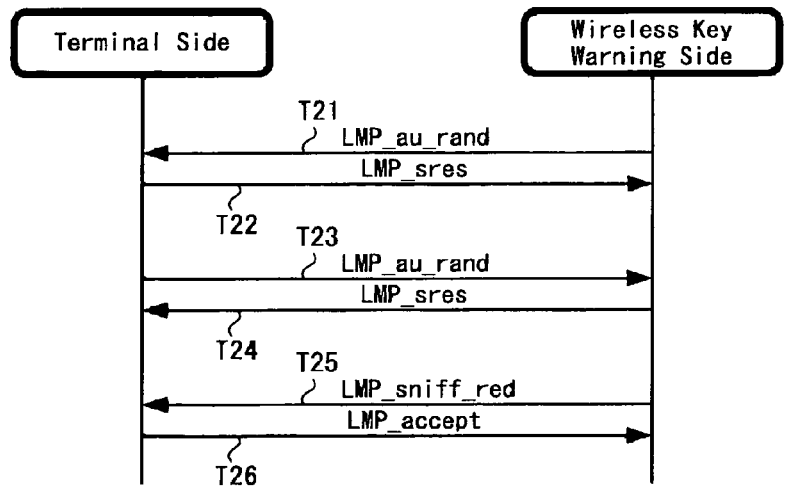
FIG. 15 is a sequence diagram showing a transmission example of a communication state message according to a first exemplified embodiment of the present invention.

FIG. 15 is a sequence diagram showing an example of the communication state shown in the flowchart of FIG. 14. More specifically, packet transmission is carried out mutually in the data transfer mode M12 for performing authentication or the like (at timing T21, T22, T23, T24). Then, after the authentication is completed, data (sniff mode request) for shifting to a low power consumption mode is transmitted (at timing T25) from the master (wireless key apparatus 50) and its consent is received (at timing T26) such that both apparatuses are shifted to a low power consumption mode (sniff mode).

Figure 16:
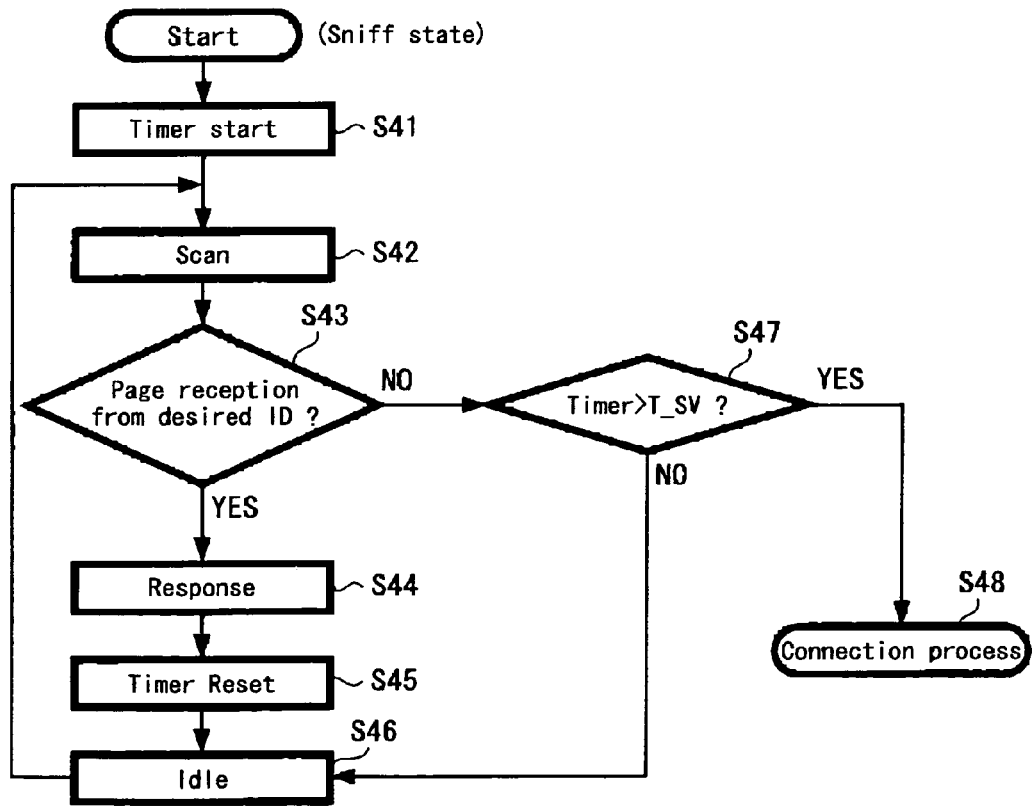
FIG. 16 is a flowchart showing a communication process example in a mobile terminal according to a first exemplified embodiment of the present invention.

FIG. 16 is a flowchart showing a process example in a low power consumption mode M13 (sniff mode) relating to the slave (mobile telephone terminal apparatus 10). The process will be explained. When it becomes a sniff mode, first, a timer is started (step S41) and a scan process for receiving a signal from the master is carried out (step S42). It is judged subsequently to the scan process whether or not a signal (page signal) added with the ID number of the wireless key apparatus 50 which is a partner carrying out a security process was received (step S43). Here, in a case when a signal added with the ID number of the wireless key apparatus 50 is received, a response signal with respect to the page signal is transmitted (step S44). Then, the timer started in step S41 is reset (step S45) and it is shifted to an idle period (step S46). When an idle period of a constant period elapses, it returns to the scan process in step S42. Here, in case of the present invention, it is constituted such that the idle period in step S46 (period when communication is not carried out) is set as a relatively longer period and at the same time, it is constituted such that it is synchronized with the idle period on the master side.

On the other hand, in a case when it is judged in step S43 that a signal added with the ID number of the wireless key apparatus 50 is not received, it is judged whether or not the timer started in step S41 exceeded a predetermined value T_SV (step S47). Then, in a case when it does not exceed the predetermined value T_SV, the flow is shifted to the idle process of step S46. Then, in a case when step S47 it is judged it exceeds the predetermined value T_SV, the communication mode is changed to a connection mode M11 (step S48). The transmission power of the transmission amplifier may be changed to be higher when the communication mode is changed to a connection mode.

Figure 17:
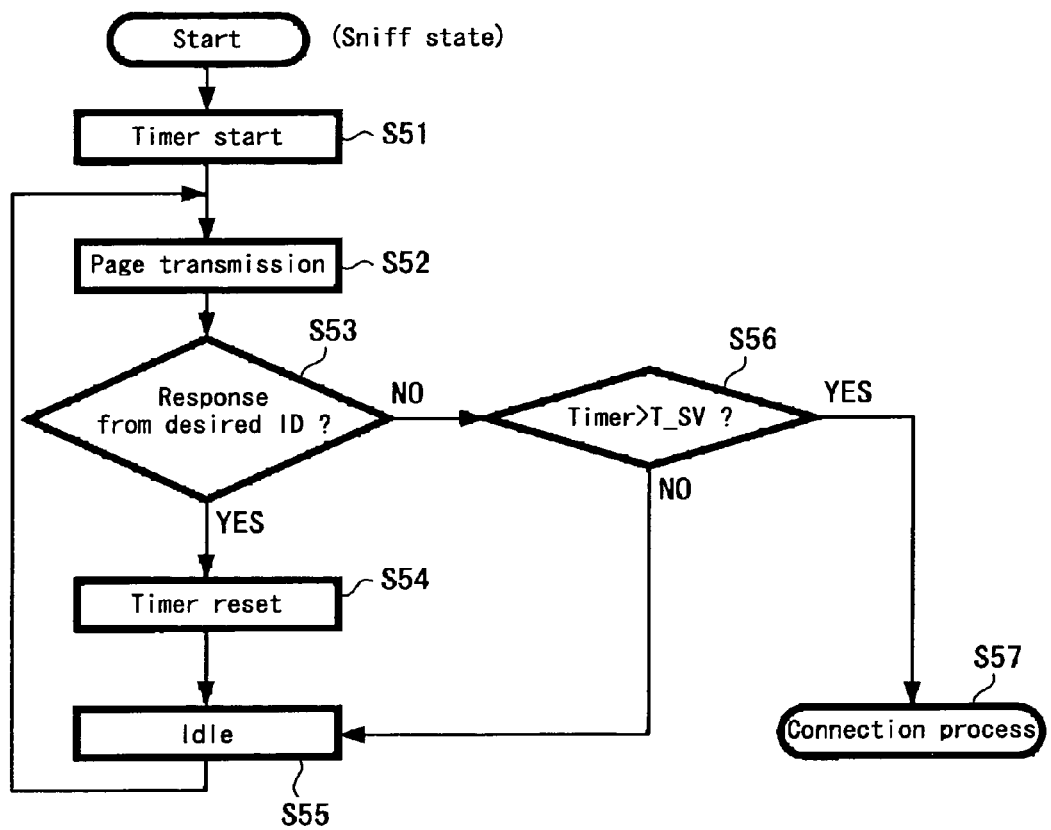
FIG. 17 is a flowchart showing a communication process example in a wireless key apparatus according to a first exemplified embodiment of the present invention.

FIG. 17 is a flowchart showing a process example in the master (wireless key apparatus 50) with respect to the low power consumption mode (sniff mode). Its process will be explained. A first timer is started when it becomes a sniff mode (step S51). Then, a process for transmitting a page signal for a predetermined period is carried out (step S52). After the transmission of this page signal, it is judged whether or not a response from a partner (mobile telephone terminal apparatus 10) which carries out a security process was received (step S53). Here, in a case when the response signal is receive, the timer started in step S51 is to be reset (step S54). Then, the flow is shifted to the idle period (step S55). When an idle period of a constant period elapses, the flow returns to the page transmission process of step S52. Here, in case of the present invention, it is constituted such the idle period (period in which the communication is not carried out) in step S55 is to be set as a relatively long period and at the same time is to be synchronized with the idle period on the slave side.

On the other hand, in a case when it is judged in step S53 that a response from the mobile telephone terminal apparatus 10 is not received, it is judged whether or not the timer started in step S51 exceeded a predetermined value T_SV (step S56). In a case when it does not exceed the predetermined value T_SV, it is shifted to the idle process of step S55. Then, in a case when it is judged in step S56 that the predetermined value T_SV is exceeded, the communication mode is changed to a connection mode M11 (step S57). When the communication mode is changed to a connection mode M11, the transmission power of the transmission amplifier may be changed to be high.

Figure 18:
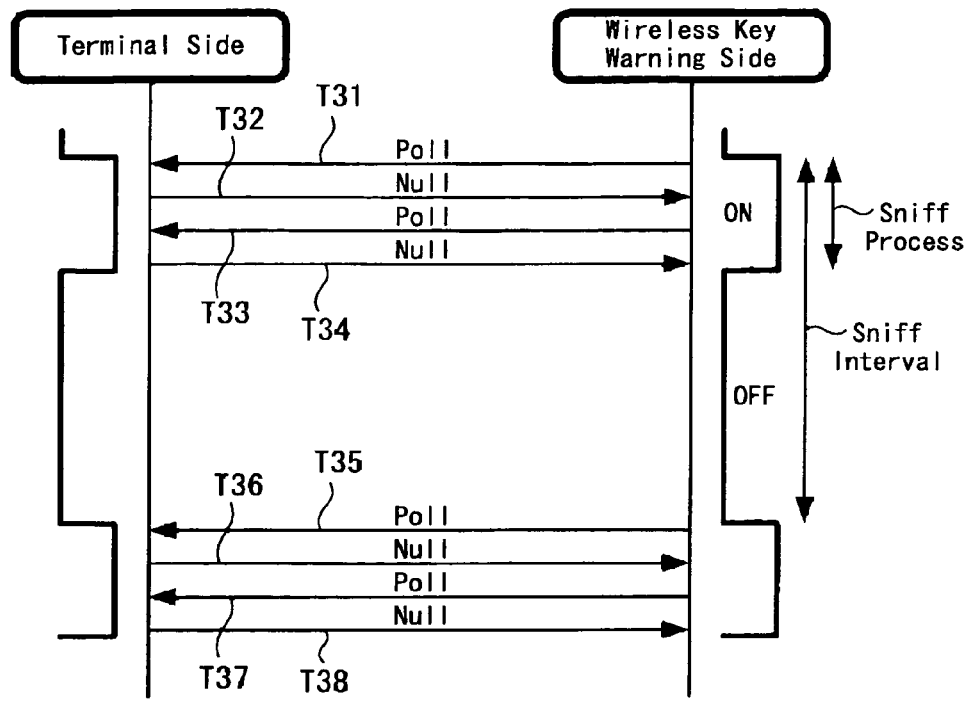
FIG. 18 is a sequence diagram showing a transmission example in a sniff state according to a first exemplified embodiment of the present invention.

FIG. 18 is a sequence diagram showing communication timings in the both apparatuses in connection with a low power consumption mode (sniff mode) M13. As shown in FIG. 18, the timing at which the sniff process (portion describes as ON) is carried out in the master and the timing at which the sniff process is carried out in the slave approximately coincide with each other. More specifically, the timings (T31, T33, T35, T37) at which polling packets are transmitted from the master and the periods when the reception thereof are carried out in the slave approximately coincide with each other. Also, respective polling packets are received by the slave and with respect to the responses thereof (at timing T32, T34, T36, T38), they are received on the master side. Owing to the fact that an intermittent bidirectional communication is carried out in this manner, a low power consumption mode M13 is maintained and a wireless connection state between the master and the slave is maintained.

Figure 19:
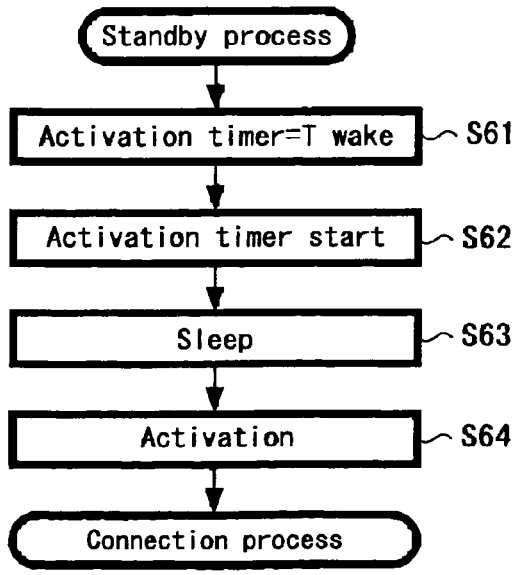
FIG. 19 is a flowchart showing a process example in a standby state according to a first exemplified embodiment of the present invention.

It should be noted in a case when the communication mode becomes a standby state that, for example, a process shown in a flowchart of FIG. 19 is carried out. More specifically, when it becomes a standby state, an activation period is set for an activation timer (step S61). Then, the activation timer is started (step S62). Then, the communication circuit is made to be in a sleep state (step S63). Thereafter, when the period set by the activate timer elapses, the communication circuit is activated (step S64) and the flow is shifted to the connection mode M11 so as to execute a connection process.

Owing to a fact that the processes explained so far are executed, in a case when the mobile telephone terminal apparatus 10 and the wireless key apparatus 50 can wireless-communicate favorably in an adjacent state, the mobile telephone terminal apparatus 10 and the wireless key apparatus 50 are maintained in a wireless-connected state using a low power consumption mode. In this wireless-connected state using the low power consumption mode, a data transfer which becomes a so-called payload is not carried out and a signal for maintaining the wireless connection is only transmitted and received intermittent. In this case, by selecting the idle period properly, it is possible to carry out a communication with very low power consumption. Therefore, it is possible to lower the power consumption caused by carrying out the security process of the present invention and it is possible to make the battery duration periods of both the mobile telephone terminal apparatus 10 and the wireless key apparatus 50 be a longer period. In particular, there is a big effect on a wireless key apparatus which is desired to be constituted in a small size as much as possible.

Also, with respect to the mobile telephone terminal apparatus 10, a security process was carried out by applying a short distance wireless communication system of the Bluetooth system which has a great number of examples already mounted on mobile telephone terminals, so that the security process of the present invention can be realized only by slightly changing a control constitution or the like of a mobile telephone terminal provided with a short distance wireless communication circuit of an existing Bluetooth system and a favorable security function is realized easily.

The process explained so far is a fundamental process for carrying out a security process of the present invention and here, in the present invention, it is constituted such that a communication is carried out between the mobile telephone terminal apparatus 10 and the wireless key apparatus 50 and a following process is to be carried out in a state in which it is wireless-connected so as to make it possible to set a security mode more favorably. More specifically, in a state in which a communication is carried out in a low power consumption mode, a communication process shown in flowcharts of FIGS. 16 and 17 is carried out with respect to a fundamental communication process, but according to the present invention, a process for judging also with respect to the strength of the received electric field and for utilizing the judgment result for one of subject matters for judgment on an occasion of the security mode selection. It should be noted in the following explanation that it is explained by an example in which the mobile telephone terminal apparatus 10 is made to be a slave and the wireless key apparatus 50 is made to be a master, but it may be constituted such that the mobile telephone terminal apparatus 10 is to be a master and the wireless key apparatus 50 is to be a slave.

Figure 20:
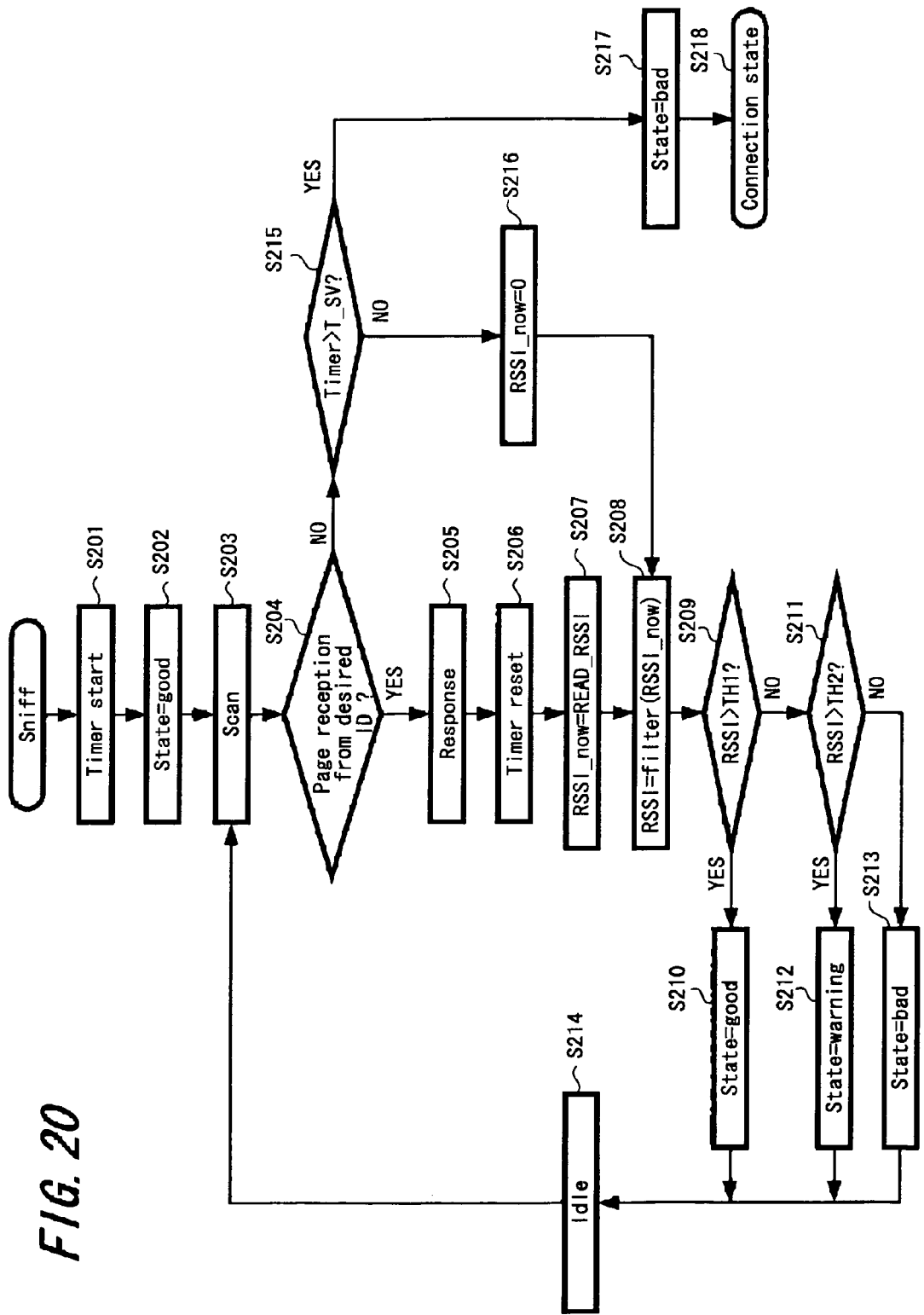
FIG. 20 is a flowchart showing a process example according to the strength of the received electric field of a slave in a sniff mode according to a first exemplified embodiment of the present invention.

FIG. 20 is a flowchart showing an example a process is carried out by measuring the strength of the received electric field (received power) at the same time in a state in which the slave (mobile telephone terminal apparatus 10) is in a low power consumption mode (sniff mode). This process is executed fundamentally by a process in the communication circuits 32 and 52 which execute the Bluetooth communication process. Also, it is constituted in order to judge a communication state according to the measured received power such that a first threshold TH1 and a second threshold TH2 are set in these communication circuits in order to be compared with the received power (TH1>TH2). It is assumed that this first threshold TH1 is, for example, to be an averaged received power value in a case when the distance between the mobile telephone terminal apparatus 10 and the wireless key apparatus 50 is several meters (for example, around 3 m). It is assumed that the second threshold TH2 is, for example, to be an averaged received power value in a case when the distance between the mobile telephone terminal apparatus 10 and the wireless key apparatus 50 is a longer distance (for example, around 7 m). Further, it is constituted such that three states of "good", "warning" and "bad" are to be set for being able to be stored as communication states.

The process will be explained according to FIG. 20, wherein first, a timer is started when it becomes a sniff mode (step S201), "good" is set as the state (step S202) and a scan process for receiving a signal from the master is carried out (step S203). It is judged in the scan process whether or not a signal added with the ID number (page signal) of the wireless key apparatus 50 which is a partner carrying out the security process is received (step S204). Here, in a case when the signal added with the ID number of the wireless key apparatus 50 was received, a response signal with respect to the page signal is transmitted (step S205), the timer which was started in step S201 is reset (step S206) and the strength of the received electric field (received power) measured in the measurement unit 34 of the strength of the received electric field is measured (step S207).

Thereafter, a filtering process of the measured received power value is carried out so as to performing the averaging thereof (step S208) and it is judged whether or not the averaged received power value is bigger than the first threshold TH1 which was set beforehand (step S209). In a case when it is bigger than the first threshold TH1, "good" is set as a state (step S210). Also, in a case when it does not exceed the first threshold TH1, it is judged whether or not the received power value is bigger than the second threshold TH2 which was set beforehand (step S211). In a case when it is bigger than the second threshold TH2, "warning" is set as a state (step S212). In a case when it does not exceed the second threshold TH2, "bad" is set as a state (step S213).

When updating of these states are carried out, the flow is shifted to an idle period (step S214). When the idle period of a constant period elapses, the flow returns to the scan process of step S203. Here, it is constituted in case of the present invention such that the idle period (period in which no communication is carried out) in step S214 is to be set as a relatively long period and at the same time is to be synchronized with the idle period on the master side.

Then, in a case when it is judged in step S204 that the signal added with the ID number of the wireless key apparatus 50 cannot be received, it is judged whether or not the timer started in step S201 exceeded a predetermined value T_SV (step S215), in a case when it does not exceed the predetermined value T_SV, the received power value at that time is made to be zero (step S216), the filtering process in step S208 is carried out so as to perform the averaging and the flow is shifted to a state judgment process subsequently to the step S209.

Then, in a case when it is judged in step S215 that a predetermined value T_SV was exceeded, "bad" is set as a state (step S217) and further more, the communication mode is changed to a connection mode (step S218). When the communication mode is changed to the connection mode, it is possible to change the transmission power of the transmission amplifier to be high.

Figure 21:
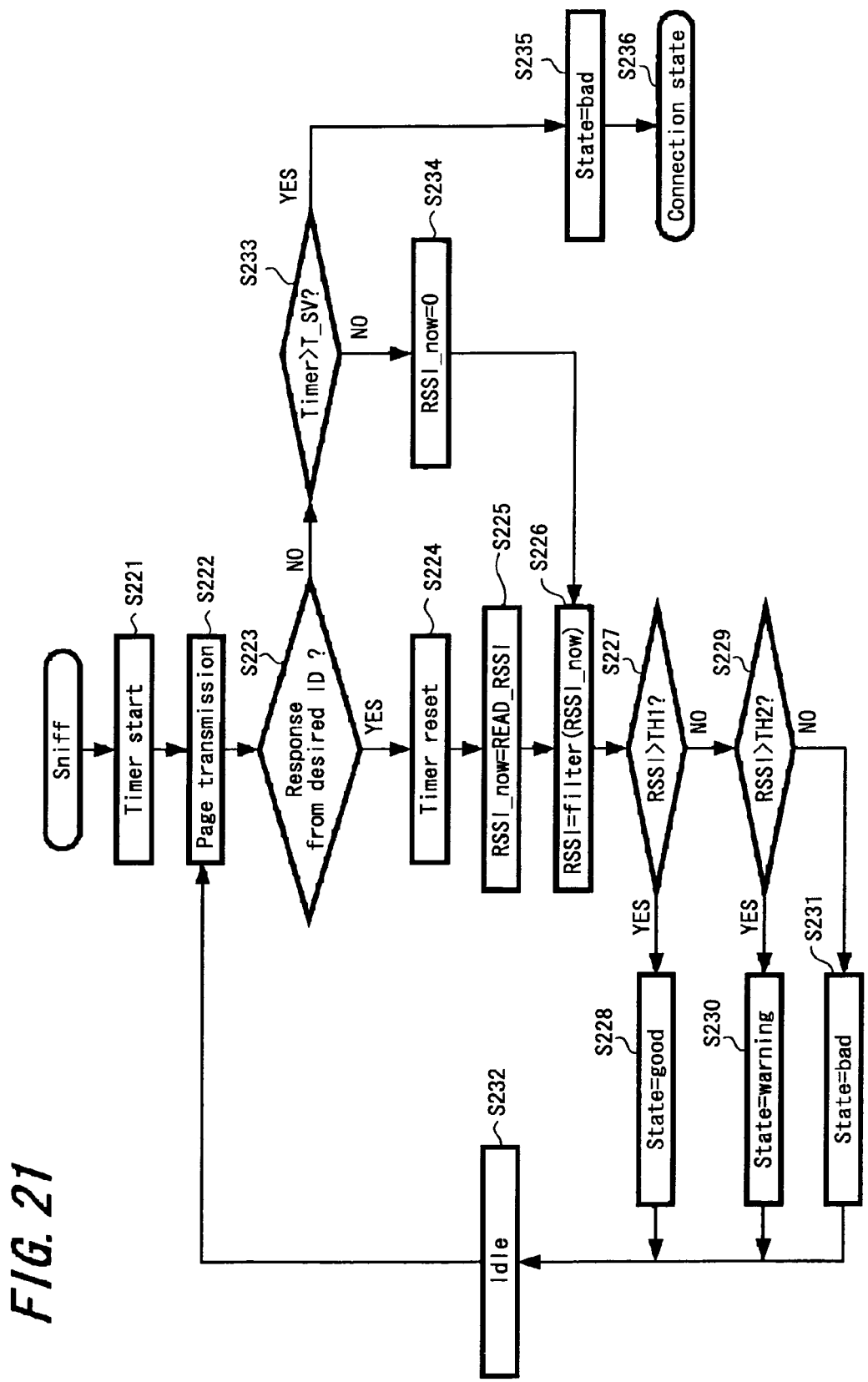
FIG. 21 is a flowchart showing a process example according to the strength of the received electric field of a master in a sniff mode according to a first exemplified embodiment of the present invention.

FIG. 21 is a flowchart showing a process example in the master (wireless key apparatus 50) with respect to the low power consumption mode (sniff mode). Its process will be explained. A first timer is started when it becomes a sniff mode (step S221). Then, a process for transmitting a page signal for a predetermined period is carried out (step S222). After the transmission of this page signal, it is judged whether or not a response from a partner (mobile telephone terminal apparatus 10) which carries out a security process was received (step S223). Here, in a case when the response signal is receive, the timer started in step S221 is to be reset (step S224). Then, the strength of the received electric field (received power) measured in the received electric field measurement unit 52b is measured (step S225).

Thereafter, a filtering process of the measured received power value is carried out so as to performing the averaging thereof (step S226) and it is judged whether or not the averaged received power value is bigger than the first threshold TH1 which was set beforehand (step S227). In a case when it is bigger than the first threshold TH1, "good" is set as a state (step S228). Also, in a case when it does not exceed the first threshold TH1, it is judged whether or not the received power value is bigger than the second threshold TH2 which was set beforehand (step S229). In a case when it is bigger than the second threshold TH2, "warning" is set as a state (step S230). In a case when it does not exceed the second threshold TH2, "bad" is set as a state (step S231).

When updating of these states are carried out, the flow is shifted to an idle period (step S232). When the idle period of a constant period elapses, the flow returns to the page signal transmission process of step S222. Here, it is constituted in case of the present invention such that the idle period (period in which no communication is carried out) in step S232 is to be set as a relatively long period and at the same time is to be synchronized with the idle period on the slave side.

Then, in a case when it is judged in step S223 that a response from the mobile telephone terminal apparatus 10 cannot be received, it is judged whether or not the timer started in step S221 exceeded a predetermined value T_SV (step S233), in a case when it does not exceed the predetermined value T_SV, the received power value at that time is made to be zero (step S234), the filtering process in step S226 is carried out so as to perform the averaging and the flow is shifted to a state judgment process subsequently to the step S227.

Then, in a case when it is judged in step S233 that a predetermined value T_SV was exceeded, "bad" is set as a state (step S235) and further more, the communication mode is changed to a connection mode (step S236). When the communication mode is changed to the connection mode, it is possible to change the transmission power of the transmission amplifier to be high.

Figure 22:
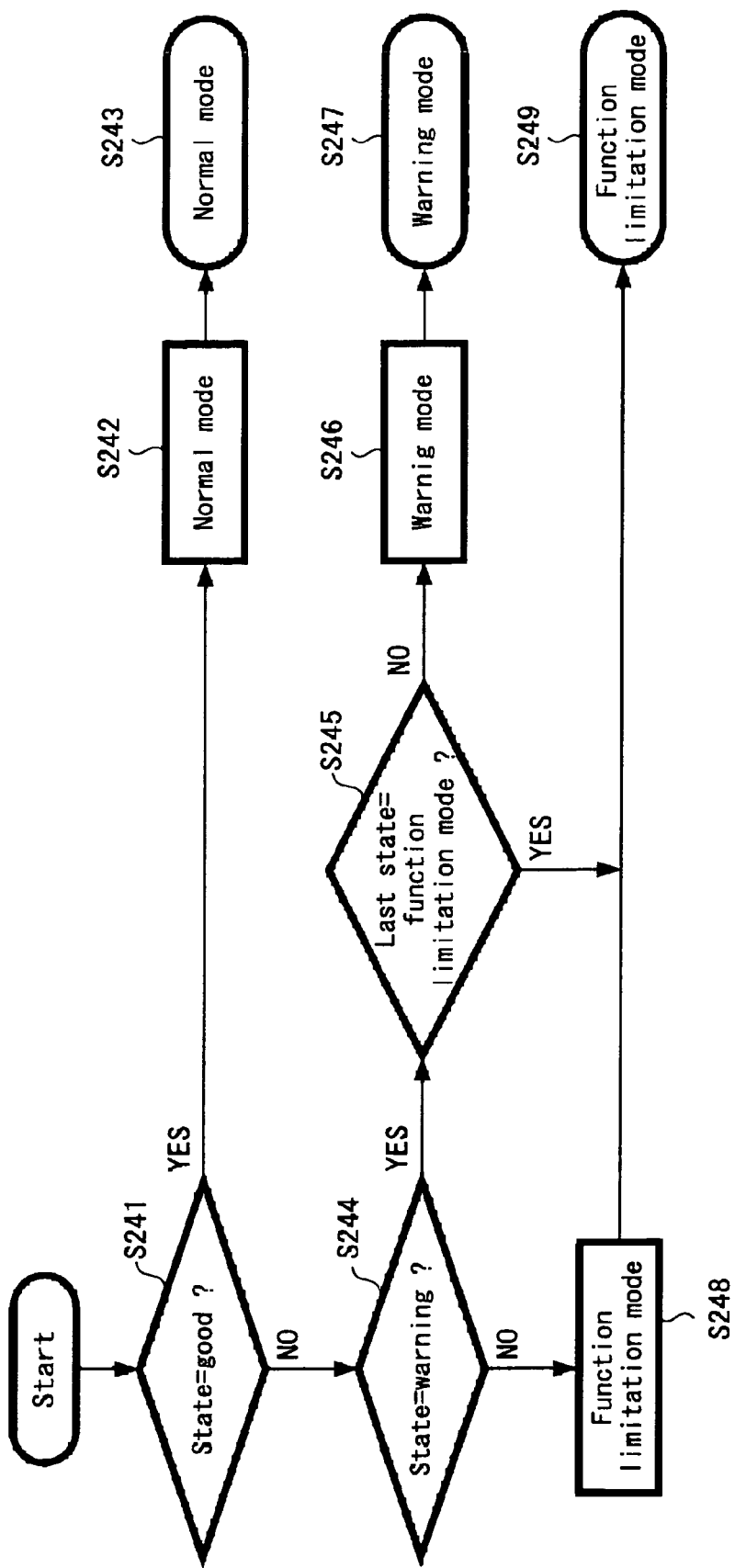
FIG. 22 is a flowchart showing a mode selection process example according to a first exemplified embodiment of the present invention.

FIG. 22 is a flowchart showing a process example for setting a security mode according to the state which was set in the process of FIG. 20 and FIG. 21. First, it is judged whether or not the state at present is "good" (step S241). In a case when the state at present is "good", a normal mode is set as the security mode (step S242) and it is operated in a normal mode (step S243).

Also, in a case when the state at present is not "good", it is judged whether or not the state at present is "warning" (step S244). In a case when the state at present is "warning", it is judged whether or not the security mode just before is a function limitation mode (step S245). In a case when the security mode just before is not a function limitation mode, a warning mode is set as the security mode (step S246) and it is operated in a warning mode (step S247).

Also, in a case in step S244 when the state at present is not "warning", a function limitation mode is set as the security mode (step S248) and it is operated in a function limitation mode (step S249). In a case when it was judged in step S245 that it is a function limitation mode, it is operated in the function limitation mode of step S249 as it was.

In this manner, by performing processes according to the measurement of the strength of the received electric field, the security mode is changed to a warning mode or a function limitation mode if there is change in a distance or a communication environment between the mobile telephone terminal apparatus 10 and the wireless key apparatus 50 even if there is a state in which the communication mode does not change in a low power consumption mode (more specifically, a state remaining as it is connected in a low power consumption mode) and the security process can be carried out favorably. Also, there is a case in which the wireless connection is maintained even in a warning mode or a function limitation mode and in such a case the communication state is to become favorable and it is possible to carry out a process returning to a normal mode rapidly.

Figure 23:
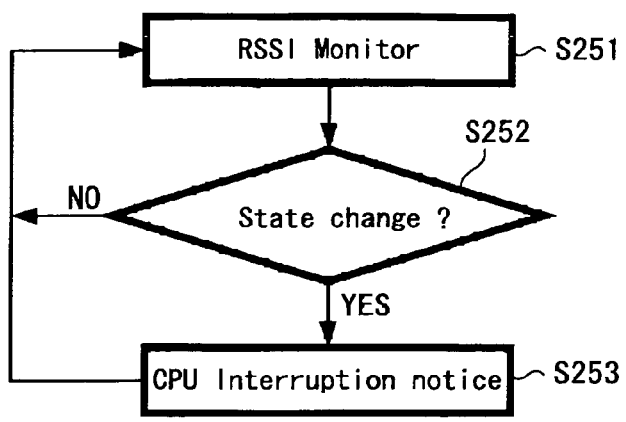
FIG. 23 is a flowchart showing an interrupting process example of a control unit according to a first exemplified embodiment of the present invention.

It should be noted that the security mode setting is carried out on the side of the control blocks 19 and 53 according to the state condition judged in the communication circuits 32 and 52, but it may be constituted such that a report of the state condition to the control unit is to be carried out, for example, by a process shown in FIG. 23. More specifically, the received power is monitored in the communication circuit (step S251) and it is judged by the result thereof whether or not the state condition was changed (step S252). Then, in a case when the state condition does not change, the state is not reported to the control unit. In a case when the state condition changed, the change of the state condition is notified to the control unit (CPU) by an interruption process (step S253). It is possible by doing in this manner to keep the processes in related to the security mode in the control unit to the minimum and this contributes to making the apparatus in low power consumption.

Figure 24:
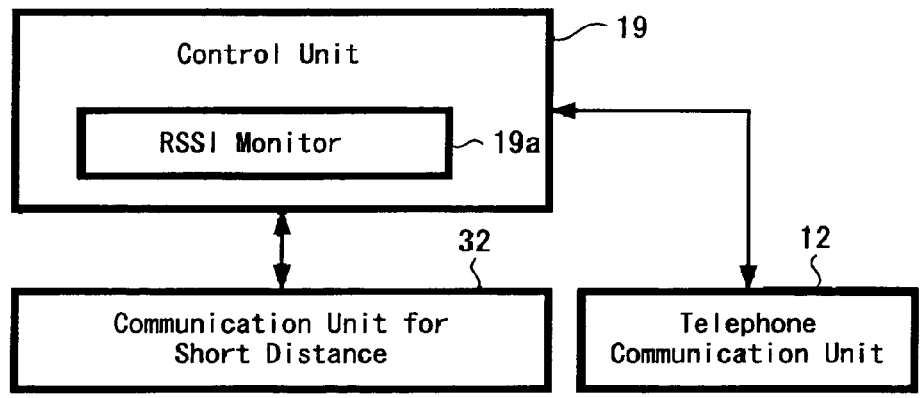
FIG. 24 is a block diagram showing a constitutional example in a case when a measurement unit of the strength of the received electric field is provided in a control unit.

Alternatively, it may be constituted in case of the mobile telephone terminal apparatus 10 as, for example, shown in FIG. 24 such that a condition judgment of the state and a setting process of the security mode are to be carried out while the control unit 19 is activated for the sake of an intermittent communication process for the telephone communication by providing a field measurement unit 19a of the strength of the received electric on the side of the control unit 19 and by processing the received power in the short distance communication circuit 32 in synchronism with the intermittent reception on the side of the communication circuit 12 for the telephone communication.

Also, in the processes in FIGS. 20 to 22 so far explained, it is constituted such that the state is to be set according to the absolute value of the receiving level which is measured, but it may be constituted such that the state is to be set according to the variation difference of the receiving level. More specifically, the receiving level fundamentally corresponds to the distance with respect to the communication partner, but practically it varies a lot according not only to the distance but also to with or without obstacles and the kinds thereof. Consequently, it is impossible judge (presume) the distance itself exactly only by the receiving level.

Figure 25:
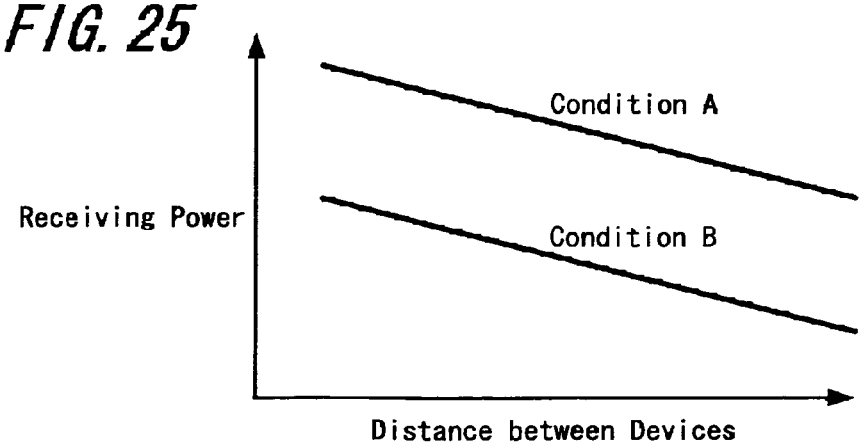
FIG. 25 is an explanatory diagram showing an example of a received electric power and a distance change between apparatuses (devices)

Here, as the received power and the wireless communication distance between the two apparatuses are shown in FIG. 25, the attenuation amount with respect to the distance is approximately constant and if the distance between the terminal apparatus 10 and the wireless key apparatus 50 goes away at the same speed, the changing amount of the receiving strength becomes approximately constant. Therefore, when a difference with respect to the receiving strength which was measured on the last occasion, • in a case when the changing amount is minus continuously (level is lowering), it is judged that the distance between the terminal apparatus and the wireless key apparatus is going away and it is shifted to a warning mode or a function limitation mode. • In a case when the changing amount is plus continuously (level is rising), it is judged that the distance between the terminal apparatus and the wireless key apparatus is getting close and the warning mode or the function limitation mode is to be released.

The difference with respect to the measured receiving strength RSSI is found, for example, as follows:

$$\Delta RSSI[n] = \text{filter}(RSSI[n] - RSSI[n-M])$$

Here, "filter" shows a process for averaging past values or for passing through a low pass filter and M is determined in response to an assumed moving speed and a sampling speed of the receiving strength RSSI.

Figure 30:
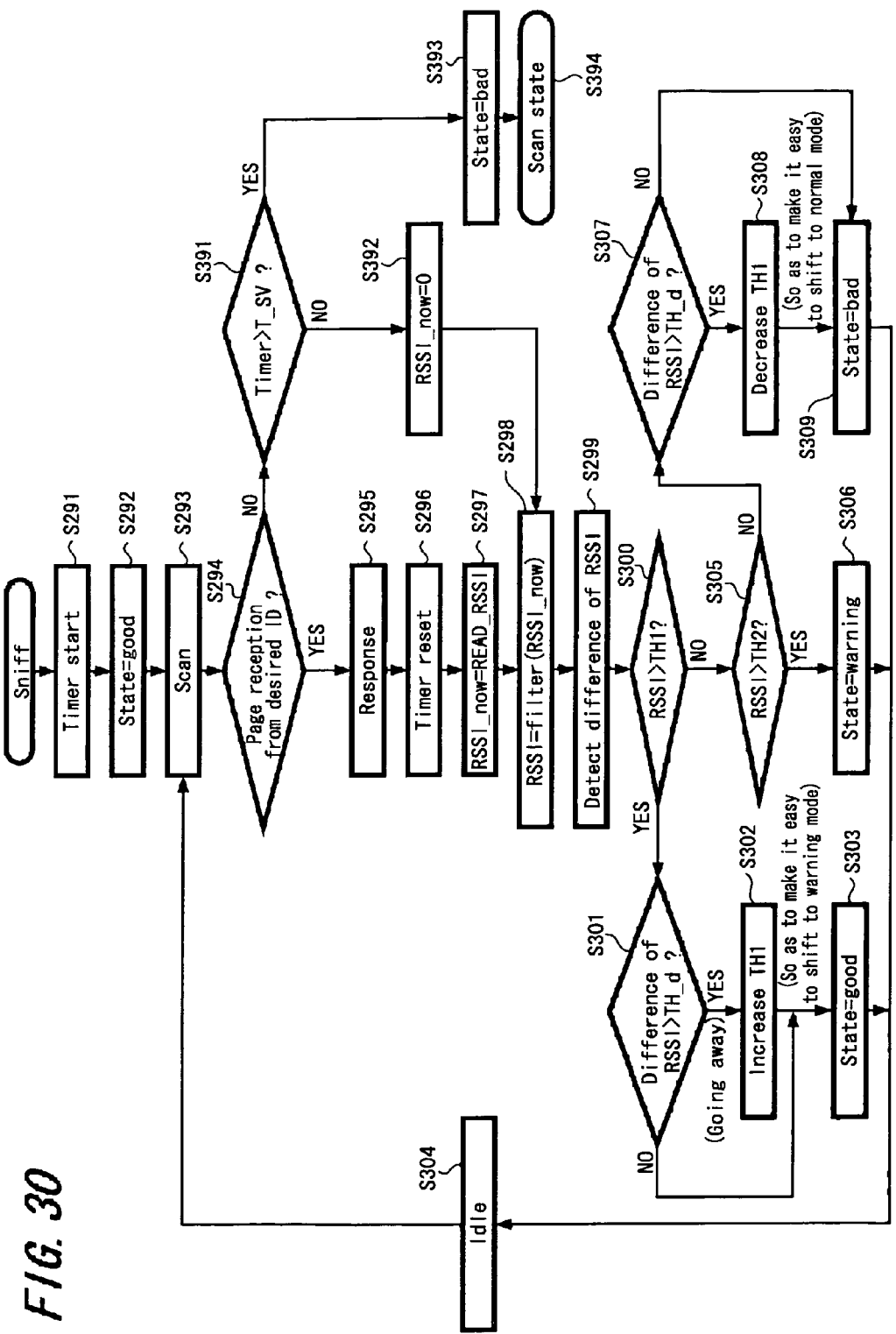
FIG. 30 is a flowchart showing a process example according to the strength of the received electric field and its difference in a sniff mode according to a first exemplified embodiment of the present invention.

FIG. 30 is a flowchart showing a process example in a case when a process according to the difference of the receiving strength and a process according to the absolute value of the receiving strength are combined. There is shown a slave example in this FIG. 30, but it is also applicable to the master side.

It will be explained according to FIG. 30, wherein first, a timer is started when it becomes a sniff mode (step S291), "good" is set as the state (step S292) and a scan process for receiving a signal from the master is carried out (step S293). It is judged in the scan process whether or not a signal added with the ID number (page signal) of the wireless key apparatus 50 which is a partner carrying out the security process is received (step S294). Here, in a case when the signal added with the ID number of the wireless key apparatus 50 was received, a response signal with respect to the page signal is transmitted (step S295), the timer which was started in step S291 is reset (step S296) and the strength of the received electric field (received power) measured in the measurement unit 34 of the strength of the received electric field is measured (step S297).

Thereafter, a filtering process of the measured received power value is carried out so as to performing the averaging thereof (step S298) and further the difference of the received power is judged (step S299). Then, it is judged whether or not the received power value averaged in step S298 is bigger than a first threshold TH1 which was set beforehand (step S300). In a case when it is bigger than the first threshold TH1, it is judged whether or not the difference judged in step S299 is smaller than −THd (step S301). Here, In a case when it is a value smaller than −THd, it is judged that the distance between the two apparatuses is going away and the first threshold TH1 is increased so as to make it easy to shift to a warning mode (step S302). Then, "good" is set as the state (step S303).

Also, in a case in step S300 when it does not exceed the first threshold TH1, it is judged whether or not the received power value is bigger than the second threshold TH2 which was set beforehand (step S305). In a case when it is bigger than the second threshold TH2, "warning" is set as a state (step S306). In a case when it does not exceed the second threshold TH2, it is judged whether or not the difference judged in step S299 is bigger than THd (step S307). Here, in a case when it is bigger than THd, it is judged that the distance of the two apparatus is getting, the first threshold TH1 is decreased so as to make it easy to shift to a normal (step S308). Then, "bad" is set as the state (step S309).

When the updating of these states is carried out, the flow is shifted to an idle period (step S304). When the idle period of a constant period elapses, the flow returns to the scan process of step S293.

Then, in a case when it is judged in step S294 that the signal added with the ID number of the wireless key apparatus 50 cannot be received, it is judged whether or not the timer started in step S291 exceeded a predetermined value T_SV (step S391), in a case when it does not exceed the predetermined value T_SV, the received power value at that time is made to be zero (step S392), the filtering process in step S298 is carried out so as to perform the averaging and the flow is shifted to the difference detection in step S299 and to the state judgment process subsequent thereto.

Then, in a case when it is judged in step S391 that a predetermined value T_SV was exceeded, "bad" is set as a state (step S393) and further more, the communication mode is changed to a connection mode (step S394).

By being processed as shown in this FIG. 30, the state judgment is carried out while a correction in response to the communication state at that time is carried out.

Also, it was constituted in the explanation so far such that the states was set individually in the mobile telephone terminal apparatus 10 and the wireless key apparatus 50 respectively so as to set the security mode, but it may be constituted when the state conditions detected respectively are transmitted to the partner by the wireless communication and the security modes are selected respectively such that the security modes are to be set by combining the own state and the state reported by the communication.

Figure 26:
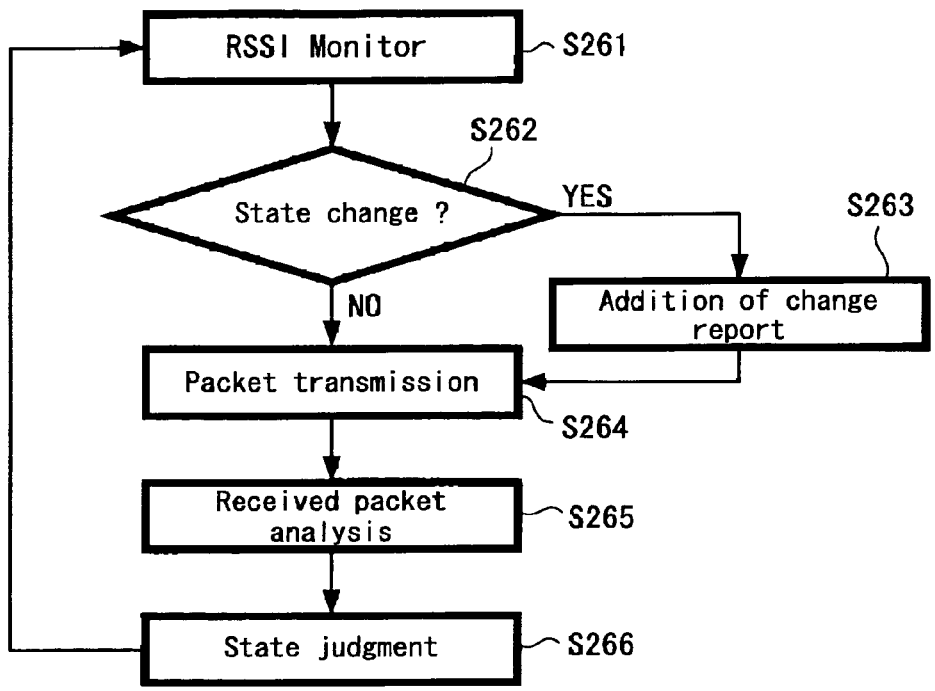
FIG. 26 is a flowchart showing a process example in a case when a state judgment result is transmitted according to a first exemplified embodiment of the present invention.

FIG. 26 is a flowchart showing a process example of this case. First, the received power is measured (step S261) and it is judged by the measurement whether or not the state was changed (step S262). Here, in a case when there was a change, data for reporting the state change to the partner are added to the packet to be transmitted (step S263). Two bits are enough for the data reporting the state change, because the states are three kinds.

Then, the packet added with the data reporting the state change or the packet not added with data reporting the state change is transmitted (step S264). Thereafter, the receiving packet is analyzed also on the own station side (step S265) and the state of the partner is judged from the data in a case when the data reporting the state change are added.

Figure 27:
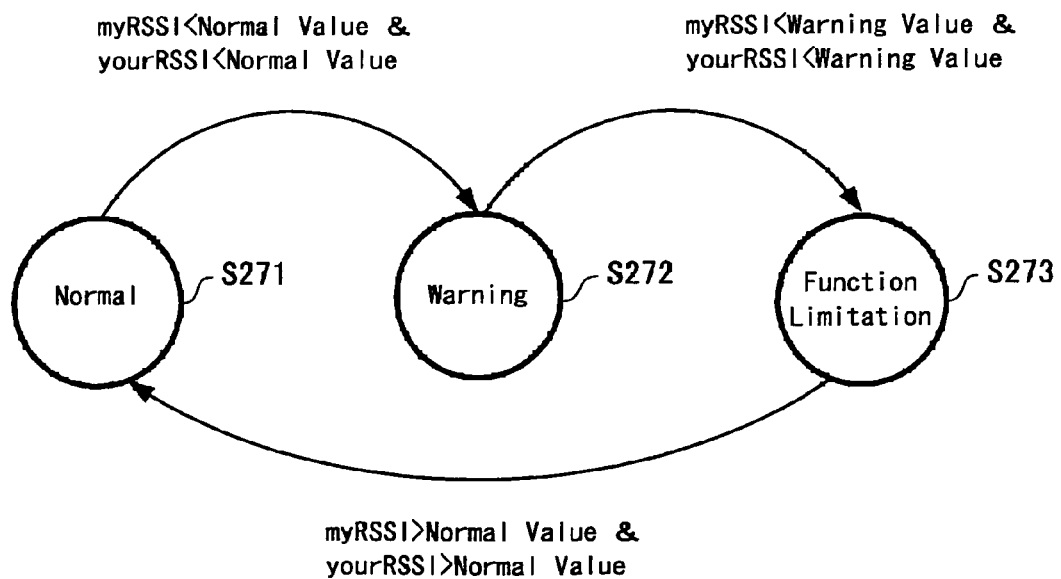
FIG. 27 is an explanatory diagram showing a mode change example according to a first exemplified embodiment of the present invention.

FIG. 27 is a diagram showing an example for setting a security mode from both the states obtained in this manner. More specifically, in a case, for example, when it is in a normal (step S271), it is made to be a warning mode if the state of the own station comes to be not "good" and at the same time the partner state station comes to be not "good" (step S272). Further, if the own station state becomes "bad" in a warning mode state and the partner state also becomes "bad", it is made to be a function limitation mode (step S273). Also, if the own station state becomes "good" in a function limitation mode state and the partner state also becomes "good", it is made to be a normal mode (step S271).

Figure 28:
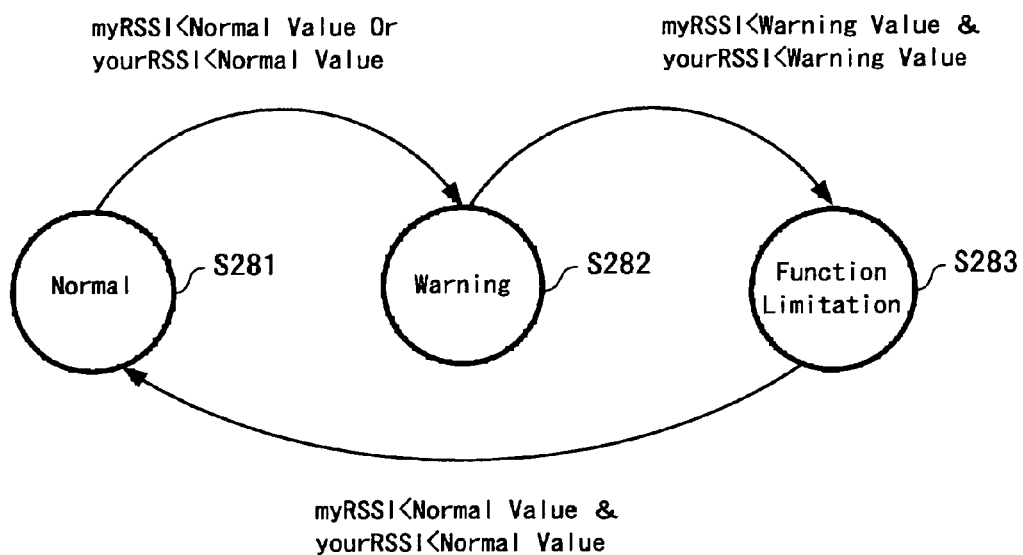
FIG. 28 is an explanatory diagram showing a mode change example (modified example) according to a first exemplified embodiment of the present invention.

Alternatively, it may be processed as shown in FIG. 28. More specifically, in a case, for example, when it is in a normal (step S281), it is made to be a warning mode if either one of the own station state and the partner state comes to be not "good" (step S282). Further, it is made to be a function limitation mode if the own station state becomes "bad" in a warning mode state and the partner state also becomes "bad" (step S283). Further, it is made to be a normal mode if the own station state becomes "good" in a function limitation mode and the partner state also becomes "good". In case of this example in FIG. 28, it becomes early for entering into a warning mode.

Figure 29:
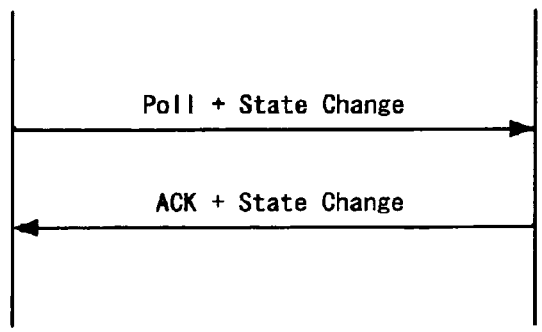
FIG. 29 is an explanatory diagram showing a mode notification example according to a first exemplified embodiment of the present invention.

With respect to a notification of the state change, it can be processed, for example, as shown FIG. 29. More specifically, the state change data are added to the packet (poll) transmitted from the master intermittently and the state change data are added to the sending back (ACK) from the slave with respect to the packet.

Next, a second exemplified embodiment of the present invention will be explained with reference to FIGS. 31 to 37. It was constituted in this exemplified embodiment similarly as the first exemplified embodiment mentioned above such that the mobile telephone terminal apparatus 10 and the wireless key apparatus 50 are prepared and a security process is to be carried out and it is similar as the first exemplified embodiment with respect to the fundamental processes. Then, while it was constituted in case of the first exemplified embodiment such that the security mode is to be set according to the strength of the received electric field in case of a low power consumption mode, it was constituted in case of this exemplified embodiment such that the security mode is to be set by judging (presuming) the communication state or the communication distance according to the detection state of the receiving packet. It is all the same as the first exemplified embodiment with respect to other processes.

It will be explained with respect to the detection process of the receiving packet with reference to FIG. 31, wherein a plurality of packets are transmitted from the wireless key apparatus in a low power consumption mode (sniff mode) when it becomes a timing at which a sniff slot is ON as shown in FIG. 31A and its response packet is transmitted from the mobile terminal apparatus as shown in FIG. 31B. The respective receiving packets are applied with error detection processes in the communication circuits it is to be judged that no error packet receiving was successful. The example of FIG. 31 shows an example in which all of the packet transmission was successful, but as shown, for example, in FIG. 32, there is also a state in a case when the communication state is "bad" in which the receiving of a packet put with an x mark is failed. This deteriorate of the communication state is approximately in proportion to the communication distance, so that it is constituted such that the communication state or the communication distance is to be judged or presumed by utilizing this phenomenon.

Figure 33:
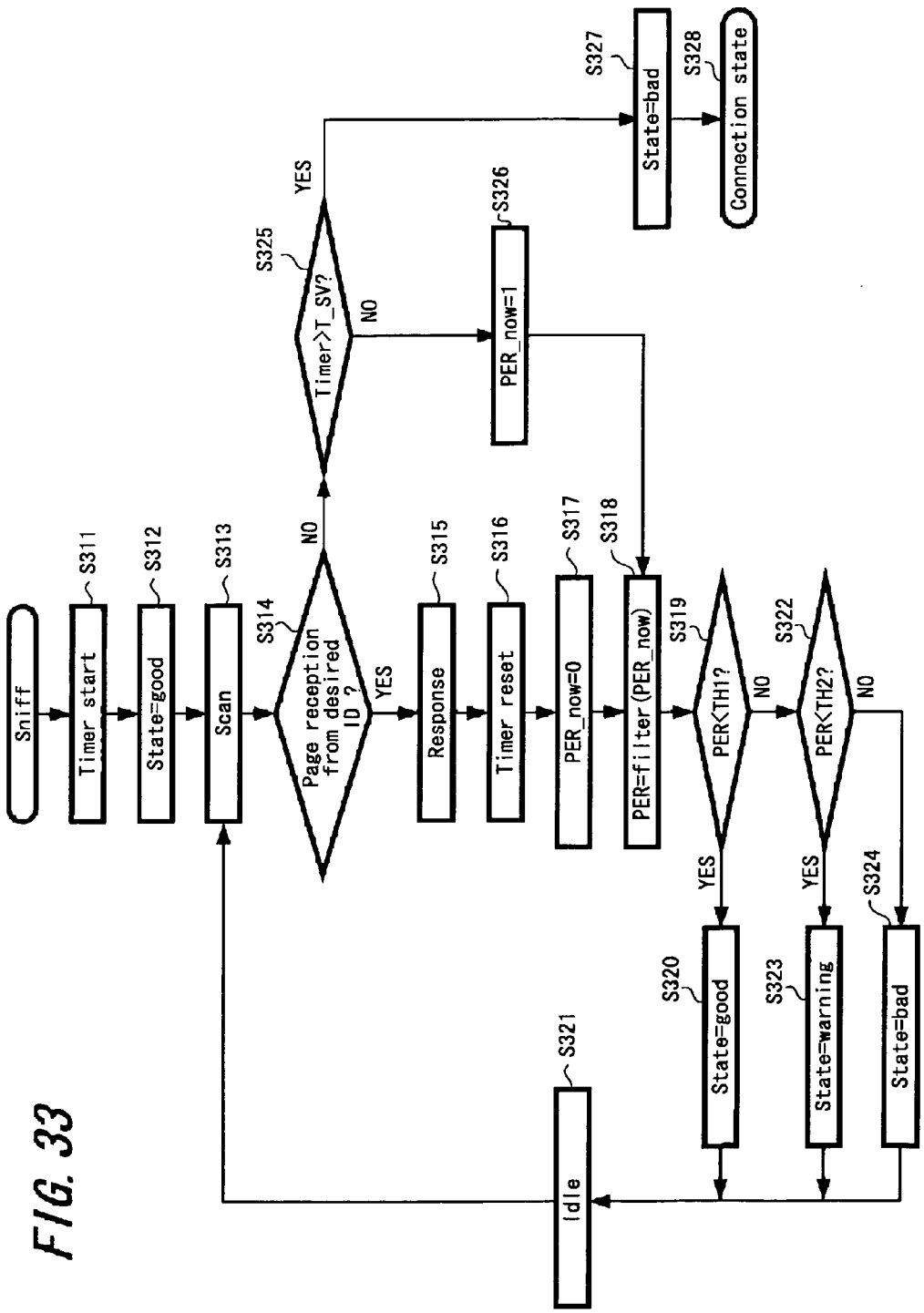
FIG. 33 is a flowchart showing a process example of a slave in a sniff mode according to a second exemplified embodiment of the present invention.

FIG. 33 is a flowchart showing an example in which the slave (mobile telephone terminal apparatus 10) of the present invention carries out a process while measuring the strength of the received electric field (received power) in a low power consumption mode (sniff mode). This process is to be executed fundamentally by the process in the communication circuits 32 and 52 executing the Bluetooth communication process. In order to judge the communication state according to the measured received power, it is constituted also in this example such that a first threshold TH1 and a second threshold TH2 is to be set in these communication circuits for comparing with the received power (TH1>TH2). It is assumed that this first threshold TH1 is, for example, to be an averaged packet error rate value in a case when the distance between the mobile telephone terminal apparatus 10 and the wireless key apparatus 50 is several meters (for example, around 3 m). It is assumed that the second threshold TH2 is, for example, to be an averaged packet error rate value in a case when the distance between the mobile telephone terminal apparatus 10 and the wireless key apparatus 50 is a longer distance (for example, around 7 m). Further, it is constituted such that three states of "good", "warning" and "bad" are to be set for being able to be stored as communication states.

The process will be explained according to FIG. 33, wherein first, a timer is started when it becomes a sniff mode (step S311), "good" is set as the state (step S312) and a scan process for receiving a signal from the master is carried out (step S313). It is judged in the scan process whether or not a signal added with the ID number (page signal) of the wireless key apparatus 50 which is a partner carrying out the security process is received (step S314). Here, in a case when the signal added with the ID number of the wireless key apparatus 50 was received correctly, a response signal with respect to the page signal is transmitted (step S315), the timer which was started in step S311 is reset (step S316) and the packet error rate PER is made to be zero (step S317).

Thereafter, a filtering process of the detected packet error rate PER is carried out so as to performing the averaging thereof (step S318) and it is judged whether or not the averaged packet error rate PER is smaller than the first threshold TH1 which was set beforehand (step S319). In a case when it is smaller than the first threshold TH1, "good" is set as a state (step S320). Also, in a case when it is not smaller than the first threshold TH1, it is judged whether or not the packet error rate value is smaller than the second threshold TH2 which was set beforehand (step S322). In a case when it is smaller than the second threshold TH2, "warning" is set as a state (step S323). In a case when it is not smaller than the second threshold TH2, "bad" is set as a state (step S324).

When updating of these states are carried out, the flow is shifted to an idle period (step S321). When the idle period of a constant period elapses, the flow returns to the scan process of step S313. Here, it is constituted in case of the present invention such that the idle period (period in which no communication is carried out) in step S321 is to be set as a relatively long period and at the same time is to be synchronized with the idle period on the master side.

Then, in a case when it is judged in step S314 that the signal added with the ID number of the wireless key apparatus 50 cannot be received, it is judged whether or not the timer started in step S311 exceeded a predetermined value T_SV (step S325), in a case when it does not exceed the predetermined value T_SV, the packet error rate at that time is made to be one (step S326), the filtering process in step S318 is carried out, so as to perform the averaging and the flow is shifted to a state judgment process subsequently to the step S319.

Then, in a case when it is judged in step S325 that a predetermined value T_SV was exceeded, "bad" is set as a state (step S327) and further more, the communication mode is changed to a connection mode (step S328). When the communication mode is changed to the connection mode, it is possible to change the transmission power of the transmission amplifier to be high.

Figure 34:
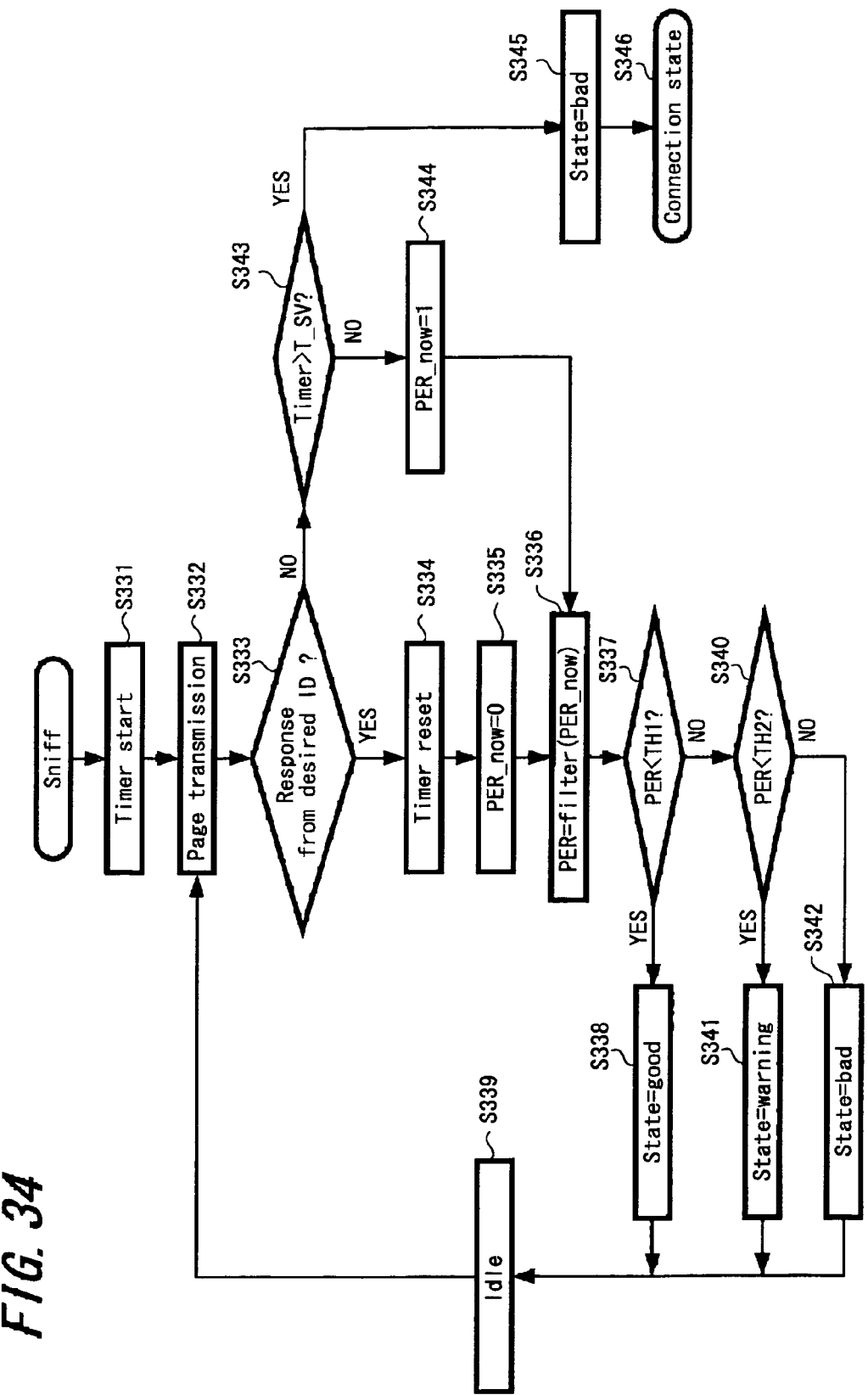
FIG. 34 is a flowchart showing a process example of a master in a sniff mode according to a second exemplified embodiment of the present invention.

FIG. 34 is a flowchart showing a process example in a low power consumption mode (sniff mode) according to the present invention in the master (wireless key apparatus 50). The process will be explained, wherein when it becomes a sniff, first, a timer is started (step S331) and a process for transmitting a page signal for a predetermined period is carried out (step S332). After the transmission of this page signal, it is judged whether or not a response was received from the partner (mobile telephone terminal apparatus 10) which carries out a security process (step S333). Here, in a case when the response signal was received, the timer started in step S334 is reset (step S334) and the packet error rate is made to be zero (step S335).

Thereafter, a filtering process of the detected packet error rate PER is carried out so as to performing the averaging thereof (step S336) and it is judged whether or not the averaged packet error rate PER is smaller than the first threshold TH1 which was set beforehand (step S337). In a case when it is smaller than the first threshold TH1, "good" is set as a state (step S338). Also, in a case when it is not smaller than the first threshold TH1, it is judged whether or not the packet error rate value is smaller than the second threshold TH2 which was set beforehand (step S340). In a case when it is smaller than the second threshold TH2, "warning" is set as a state (step S341). In a case when it is not smaller than the second threshold TH2, "bad" is set as a state (step S342).

When updating of these states are carried out, the flow is shifted to an idle period (step S339). When the idle period of a constant period elapses, the flow returns to the page signal transmission process of step S332. Here, it is constituted in case of the present invention such that the idle period (period in which no communication is carried out) in step S339 is to be set as a relatively long period and at the same time is to be synchronized with the idle period on the slave side.

Then, in a case when it is judged in step S333 that a response from the mobile telephone terminal apparatus 10 cannot be received, it is judged whether or not the timer started in step S331 exceeded a predetermined value T_SV (step S343), in a case when it does not exceed the predetermined value T_SV, the packet error rate at that time is made to be one (step S344), the filtering process in step S336 is carried out so as to perform the averaging and the flow is shifted to a state judgment process subsequently to the step S337.

Then, in a case when it is judged in step S343 that a predetermined value T_SV was exceeded, "bad" is set as a state (step S345) and further more, the communication mode is changed to a connection mode (step S346). When the communication mode is changed to the connection mode, it is possible to change the transmission power of the transmission amplifier to be high.

The process, for example, already explained in FIG. 22 is with respect to a process for setting a security mode according to the state set in the process of FIGS. 33 and 34. In this manner, by carrying out a process according to the packet error rate, a security process can be carried out favorably similarly as in a case of the first exemplified embodiment where the process is carried out according to the measurement of the strength of the received electric field.

It should be noted in the examples so far that it was constituted such that it is judged by the packet error rate, but it may be constituted such that a similar judgment is to be carried out by changing a number of packets transmitted in one unit sniff slot on the transmission side according to the state and by detecting that number of packets on the receiving side. More specifically, if the received number of packets are assumed to be N and when it is in a normal mode as shown in FIG. 35 (step S361), it is made to be a warning mode when the number of packets which could be received become smaller than the number of packets N of the state "good" (step S362). If the number of packets that could be received in the warning mode exceeds the number of packets N of the state "good", it is returned to a normal mode. Then, if the number of packets that could be received in the warning mode becomes smaller than the number of packets N of the warning state, it is made to be a function limitation mode (step S363). If the number of packets N of the state "good" is detected in the function limitation mode, it is returned to a normal mode.

By limiting the number of packets in this manner, as shown, for example, in FIG. 36, the number of packets transmitted during a sniff slot period between the mobile telephone terminal apparatus 10 and the wireless key apparatus 50 come to be changed.

Figure 37:
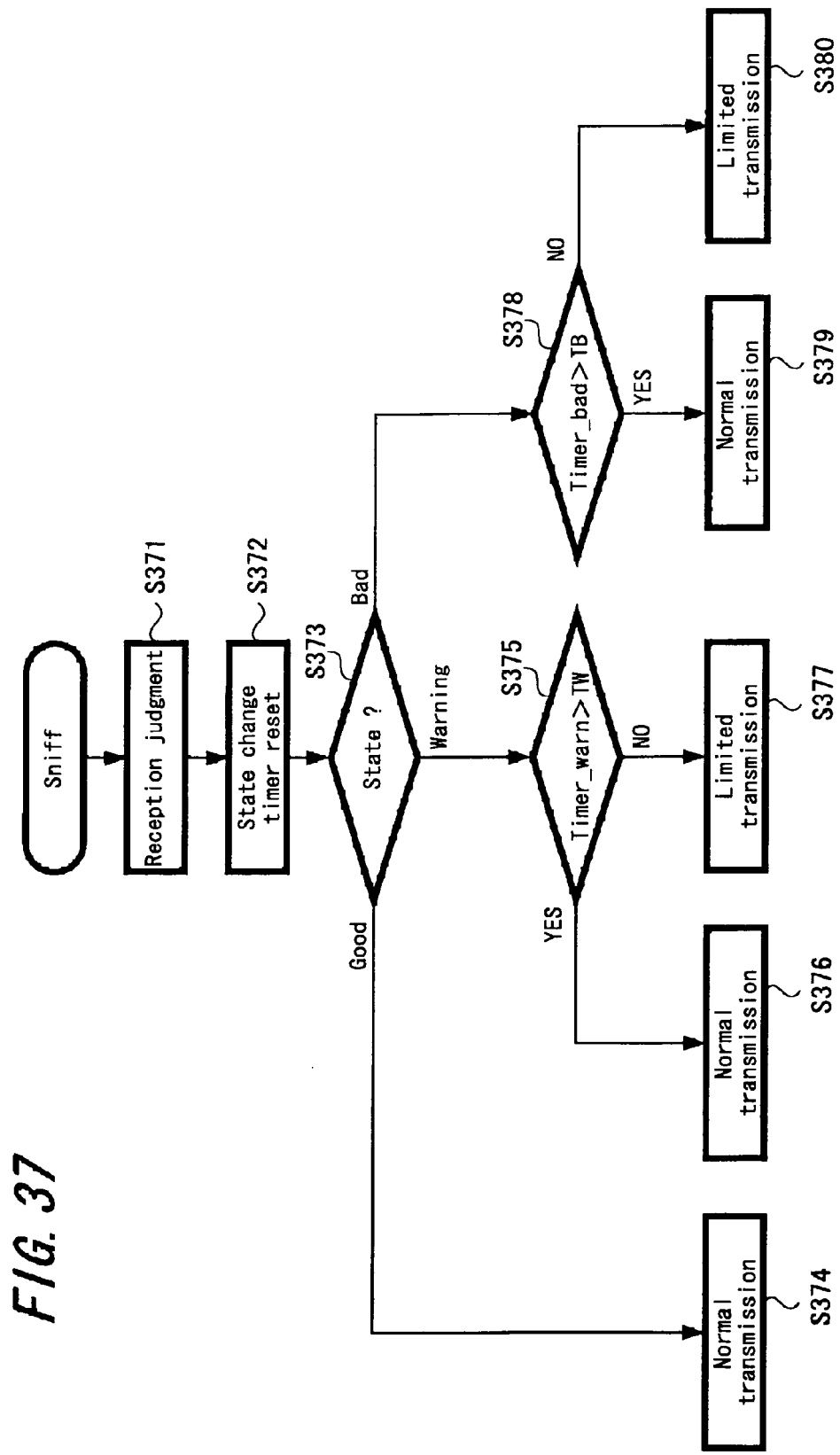
FIG. 37 is a flowchart showing an example of a limitation process for the transmission number of packets according to a second exemplified embodiment of the present invention.

FIG. 37 is a flowchart showing a process example for selecting the number of packets to be transmitted. First, a receiving judgment is carried out (step S371), a state condition timer is reset (step S372) and it is judged which one the state at present belongs to (step S373). Here, in a case when the state is "good", the transmission is carried out with the normal number of packets (step S374). Also, in a case when the state is "warning", it is judged whether or not the value of the state condition timer exceeds a predetermined value TW (step S375), in a case when it is exceeded, the transmission is carried out with the normal number of packets (step S376) and in a case when it is not exceeded, the transmission is carried out with the limited number of packets (step S377).

Also, in a case when the state is "bad", it is judged whether or not the value of the state condition timer exceeds a predetermined value TB (step S378), in a case when it is exceeded, the transmission is carried out with the normal number of packets (step S379 and in a case when it is not exceeded, the transmission is carried out with the limited number of packets (step S380).

By changing the number of packets to be transmitted in this manner, it is possible to notify the state to the partner even if data for notifying the state are not added to the packet and an efficient security process can be carried out.

It should be noted in each of the exemplified embodiments mentioned above that short distance wireless communication means of such as Bluetooth system or the like was installed in the mobile telephone terminal 10 and the short distance wireless communication means was used for actuating the security mode, but it may be constituted, for example, such that the short distance wireless communication is not installed in the mobile telephone terminal 10 the short distance wireless communication means is to be connected to the mobile telephone terminal 10 externally. More specifically, for example, two of an apparatus which corresponds to the wireless key apparatus are prepared and one of the two wireless key apparatuses is connected to the mobile telephone terminal 10 such that the security mode is to be set according to the communication mode of the two of wireless key apparatuses.

Also, in the exemplified embodiment explained so far, a communication circuit of a Bluetooth system was installed in a mobile telephone terminal such that a wireless communication is to be carried out with the wireless key apparatus by that communication circuit, but it may be constituted such that a wireless communication is to be carried out with the wireless key apparatus by means of another wireless communication system. More specifically, if it is a system which at least includes a first communication mode which enables a data transfer as a wireless communication system between both apparatuses which communicate each other and a second communication mode which carries out a wireless communication between both the apparatuses in a period shorter than that of the communication in the first communication mode in a wireless-connected state maintained, similar processes as those of the exemplified embodiment mentioned above are possible and applicable.

Also, in case of the Bluetooth system, one of the apparatuses which carry out a communication becomes a master and the other one becomes slave and to make the above mentioned wireless key apparatus side be a master and to make the mobile terminal side be a slave is only one example and it is allowed to reverse the relation there-between. Also, it may be constituted such that the master and the slave are counter-changed on the communication halfway.

Also, in the exemplified embodiment mentioned above, it was applied to the security assuring process of the mobile telephone terminal apparatus, but it may be constituted such that it is applied to a process for assuring the security of other mobile type.

Further, also with respect to the wireless key apparatus, an example which was constituted as a key apparatus for exclusive use was employed in the exemplified embodiment mentioned above, but it may be constituted such that a program which makes if function as a key apparatus of the present invention is installed to a terminal apparatus capable of communicating by the Bluetooth system or the like (for example, PDA apparatus or the like) so as to function as a key apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system comprising:
   a communication terminal apparatus; and
   a wireless key apparatus which wireless-communicates with the communication terminal apparatus by a predetermined wireless communication system and in which a mode relating to a function limitation of said communication terminal apparatus or a notification mode relating to the function limitation is set in response to a communication state between said communication terminal apparatus and said wireless key apparatus,
   wherein said predetermined wireless communication system is a wireless communication system in which a wireless communication is carrying out intermittently between two wireless-connected apparatuses;
   each of said communication terminal apparatus and said wireless key apparatus comprises:
   a communication circuit for carrying out a wireless communication by said predetermined wireless communication system;
   a control unit for controlling communication state in said communication circuit;
   judgment means for judging or presuming wireless communication state or wireless communication distance in said communication circuit; and
   when there is judgment or presumption of a predetermined state in said judgment means in a state in which said communication terminal apparatus and said wireless key apparatus are wireless-connected, a communication state in which a wireless communication is carried out intermittently is set in each communication circuit and the wireless connection is maintained, said control unit changes mode setting relating to said function limitation or notification mode setting relating to the function limitation.

2. A communication system which sets a mode relating to a function limitation or a notification mode relating to the function limitation in response to a wireless communication state by a predetermined wireless communication system with a specific partner, wherein
   said wireless predetermined communication system is a wireless communication system which carries out intermittently between two wireless-connected apparatuses and the system comprises:
   a communication circuit for carrying out a wireless communication by said predetermined wireless communication system;
   a control unit for controlling the communication state in said communication circuit;
   a judgment means for judging or presuming a wireless communication state or a wireless communication distance in said communication circuit; and
   said control means changes setting of a mode relating to said function limitation or a notification mode relating to the function limitation when a communication state carrying out a wireless communication intermittently with said specific partner is set in said communication means and there is judgment or presumption of a predetermined state in said judgment means in a state in which the wireless connection is maintained.

3. The apparatus according to claim 2, wherein
   the result judged or presumed in said judgment means is notified to said specific partner by a wireless communication through said communication means and the judged or presumed result transmitted from said specific partner is also received; and
   said control unit changes the setting of the mode relating to said function limitation or the notification mode relating to the function limitation according to a combination of said received result and a judgment state or a presumption state in said judgment means.

4. The apparatus according to claim 2, wherein the signal strength of the received electric field which was received by said communication means is used for the judgment or presumption in said judgment means.

5. The apparatus according to claim 4, wherein the wireless communication state or the wireless communication distance is judged or presumed according to variation difference in the judged value of said strength of the received electric field.

6. The apparatus according to claim 2, wherein said judgment means judges or presumes according to a detected state of a signal packet which was received by said communication circuit.

7. The apparatus according to claim 6, wherein the number of packets transmitted from said communication circuit is changed according to the judged or presumed result of said judgment means.

8. The apparatus according to claim 2, wherein only when the judged state in said judgment means changes by an amount equal or more than a predetermined degree, the judgment result is notified to said control unit and said control unit carried out said mode setting.

* * * * *